United States Patent
Park et al.

(10) Patent No.: US 10,206,230 B2
(45) Date of Patent: Feb. 12, 2019

(54) METHOD FOR TRANSMITTING FRAME IN WIRELESS LOCAL AREA NETWORK AND WIRELESS TERMINAL USING THE SAME

(71) Applicant: LG ELECTRONICS INC., Seoul (KR)

(72) Inventors: Hyunhee Park, Seoul (KR); Kiseon Ryu, Seoul (KR); Suhwook Kim, Seoul (KR); Jeongki Kim, Seoul (KR); Jinsoo Choi, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 15/690,129

(22) Filed: Aug. 29, 2017

(65) Prior Publication Data

US 2018/0192444 A1   Jul. 5, 2018

Related U.S. Application Data

(60) Provisional application No. 62/441,454, filed on Jan. 2, 2017, provisional application No. 62/442,451, filed on Jan. 5, 2017.

(51) Int. Cl.
*H04W 4/00*   (2018.01)
*H04W 74/08*  (2009.01)
(Continued)

(52) U.S. Cl.
CPC ... *H04W 74/0833* (2013.01); *H04W 72/0446* (2013.01); *H04W 74/002* (2013.01);
(Continued)

(58) Field of Classification Search
CPC ......... H04W 74/0833; H04W 74/0808; H04W 74/002; H04W 72/0446; H04W 52/0235; H04W 88/02; H04W 84/12
See application file for complete search history.

(56) References Cited

U.S. PATENT DOCUMENTS

| 2016/0219522 | A1* | 7/2016  | Asterjadhi | H04W 52/0274 |
| 2016/0381704 | A1* | 12/2016 | Chu        | H04W 74/04 370/329 |
| 2017/0339680 | A1* | 11/2017 | Jia        | H04W 28/02 |

OTHER PUBLICATIONS 802.11 Working Group of the LAN/MAN Standards Committee of the IEEE Computer Society, "Draft Standard for Information technology Telecommunications and information exchange between systems Local and metropolitan area networks Specific requirements", IEEE P802.11ax™/D1.0, Nov. 2016, 453 pages.

* cited by examiner

*Primary Examiner* — Phuc H Tran
(74) *Attorney, Agent, or Firm* — Lee, Hong, Degerman, Kang & Waimey PC

(57) ABSTRACT

A method for transmitting a frame, performed by a first wireless terminal, in a WLAN system according to one embodiment includes: receiving, from a second wireless terminal, a beacon frame including first parameter set information for first channel access of a plurality of user terminals participating in multi-user uplink transmission, timer information indicating an allowed time allowed for the first parameter set information, first TWT information for a first TWT service period, and second TWT information for a second TWT service period; performing a countdown operation based on a backoff counter set according to the first parameter set information when a trigger frame for individually allocating a plurality of radio resources is received in the first TWT service period; suspending the countdown operation when the countdown operation is not completed until the first TWT service period expires; and resuming the countdown operation when the second TWT service period starts.

10 Claims, 20 Drawing Sheets

(51) Int. Cl.
*H04W 72/04* (2009.01)
*H04W 74/00* (2009.01)
*H04W 52/02* (2009.01)
*H04W 84/12* (2009.01)
*H04W 88/02* (2009.01)

(52) U.S. Cl.
CPC .... *H04W 74/0808* (2013.01); *H04W 52/0235* (2013.01); *H04W 84/12* (2013.01); *H04W 88/02* (2013.01)

FIG. 1
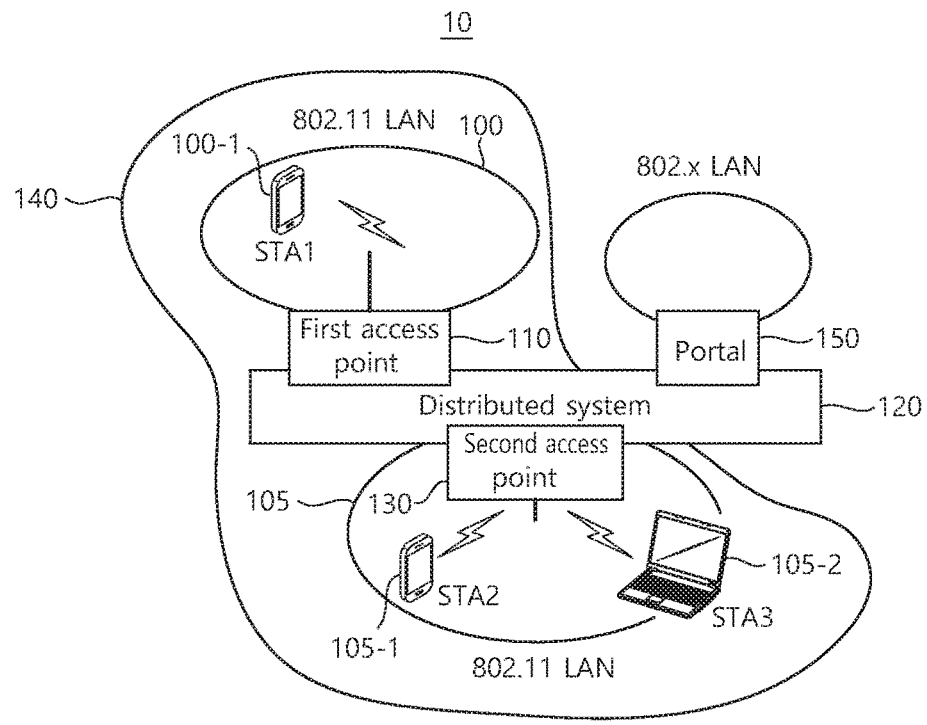
(A)
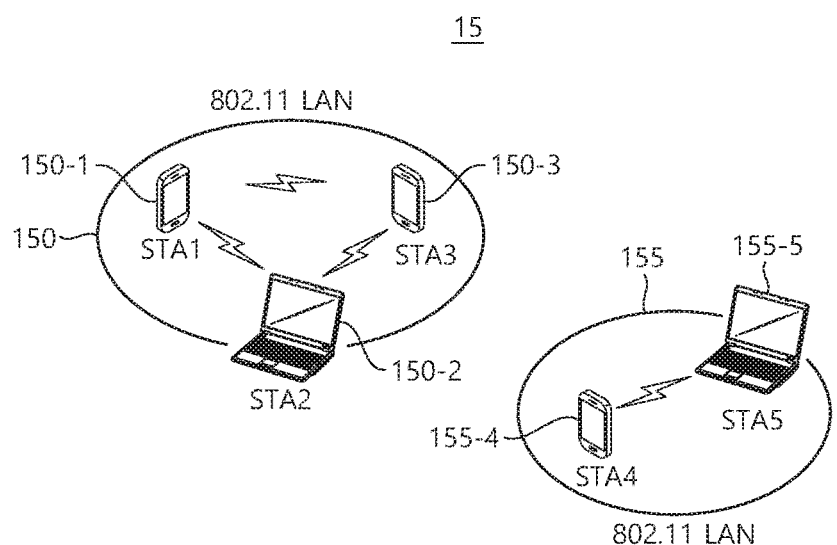
(B)

METHOD FOR TRANSMITTING FRAME IN WIRELESS LOCAL AREA NETWORK AND WIRELESS TERMINAL USING THE SAME

CROSS-REFERENCE TO RELATED APPLICATIONS

Pursuant to 35 U.S.C. § 119(e), this application claims the benefit of U.S. Provisional Patent Application Nos. 62/441,454, filed on Jan. 2, 2017 and 62/442,451, filed on Jan. 5, 2017, the contents of which are all hereby incorporated by reference herein in their entirety.

BACKGROUND OF THE INVENTION

Field of the Invention

The present invention relates to wireless communication, and more particularly, to a method for transmitting a frame in a wireless local area network system, and a wireless terminal using the same.

Related Art

A next-generation WLAN is aimed at 1) improving Institute of Electrical and Electronics Engineers (IEEE) 802.11 physical (PHY) and medium access control (MAC) layers in bands of 2.4 GHz and 5 GHz, 2) increasing spectrum efficiency and area throughput, and 3) improving performance in actual indoor and outdoor environments, such as an environment in which an interference source exists, a dense heterogeneous network environment, and an environment in which a high user load exists.

In the next-generation WLAN, a dense environment having a great number of access points (APs) and stations (STAs) is primarily considered. Discussions have been conducted on improvement in spectrum efficiency and area throughput in this dense environment. The next-generation WLAN pays attention to actual performance improvement not only in an indoor environment but also in an outdoor environment, which is not significantly considered in the existing WLAN.

Specifically, scenarios for a wireless office, a smart home, a stadium, a hotspot, and the like receive attention in the next-generation WLAN. Discussions are ongoing on improvement in the performance of a WLAN system in the dense environment including a large number of APs and STAs based on relevant scenarios.

SUMMARY OF THE INVENTION

The present specification relates to a method for transmitting a frame in a wireless local area network (WLAN) system. A method for transmitting a frame in a WLAN system according to one embodiment includes: receiving, by a first wireless terminal, from a second wireless terminal, a beacon frame including first parameter set information for first channel access of a plurality of user terminals participating in multi-user uplink transmission, timer information indicating an allowed time allowed for the first parameter set information, first target wake time (TWT) information for a first TWT service period, and second TWT information for a second TWT service period; performing, by the first wireless terminal, a countdown operation based on a backoff counter which is set according to the first parameter set information when a trigger frame for individually allocating a plurality of radio resources for the plurality of user terminals is received in the first TWT service period; suspending, by the first wireless terminal, the countdown operation when the countdown operation is not completed until the first TWT service period expires; and resuming, by the first wireless terminal, the countdown operation when the second TWT service period starts, wherein the resumed countdown operation is performed for a remaining time excluding an elapsed time in the first TWT service period out of the allowed time.

BRIEF DESCRIPTION OF THE DRAWINGS

FIG. 1 is a conceptual view illustrating the structure of a wireless local area network.

DESCRIPTION OF EXEMPLARY EMBODIMENTS

Figure 2:
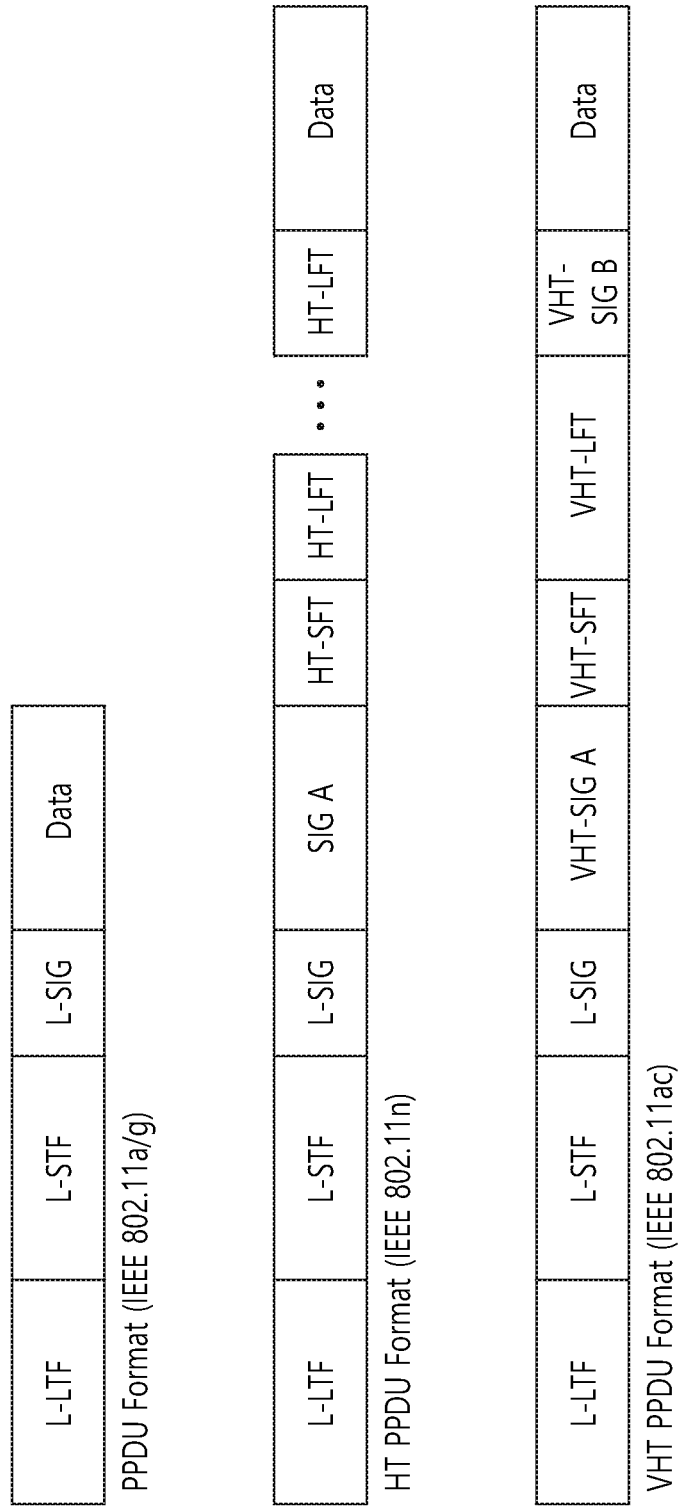
FIG. 2 is a diagram illustrating an example of a PPDU used in an IEEE standard.

The aforementioned features and following detailed descriptions are provided for exemplary purposes to facilitate explanation and understanding of the present specification. That is, the present specification is not limited to such an embodiment and thus may be embodied in other forms. The following embodiments are examples only for completely disclosing the present specification and are intended to convey the present specification to those ordinarily skilled in the art to which the present specification pertain. Therefore, where there are several ways to implement constitutional elements of the present specification, it is necessary to clarify that the implementation of the present specification is possible by using a specific method among these methods or any of its equivalents.

When it is mentioned in the present specification that a certain configuration includes particular elements, or when it is mentioned that a certain process includes particular steps, it means that other elements or other steps may be further included. That is, the terminology used herein is for the purpose of describing particular embodiments only, and is not intended to limit the concept of the present specification. Further, embodiments described to help understanding of the invention also include complementary embodiments thereof.

Terms used in the present specification have the meaning as commonly understood by those ordinarily skilled in the art to which the present specification pertains. Commonly used terms should be interpreted as having a meaning that is consistent with their meaning in the context of the present specification. Further, terms used in the present specification should not be interpreted in an excessively idealized or formal sense unless otherwise defined. Hereinafter, an embodiment of the present specification is described with reference to the accompanying drawings.

FIG. 1 is a conceptual view illustrating the structure of a wireless local area network (WLAN). FIG. 1(A) illustrates the structure of an infrastructure basic service set (BSS) of institute of electrical and electronic engineers (IEEE) 802.11.

Referring the FIG. 1(A), the wireless LAN system (10) of the FIG. 1(A) may include one or more infrastructure BSSs 100 and 105 (hereinafter, referred to as BSS). The BSSs 100 and 105 as a set of an AP and an STA such as an access point (AP) 125 and a station (STA1) 100-1 which are successfully synchronized to communicate with each other are not concepts indicating a specific region.

For example, The BSS 100 may include one AP 110 and one or more STAs 100-1 which may be associated with one AP 110. The BSS 105 may include one or more STAs 105-1 and 105-2 which may be associated with one AP 130.

The infrastructure BSS 100, 105 may include at least one STA, APs 125, 130 providing a distribution service, and a distribution system (DS) 120 connecting multiple APs.

The distribution system 120 may implement an extended service set (ESS) 140 extended by connecting the multiple BSSs 100 and 105. The ESS 140 may be used as a term indicating one network configured by connecting one or more APs 110 or 130 through the distribution system 120. The AP included in one ESS 140 may have the same service set identification (SSID).

A portal 150 may serve as a bridge which connects the wireless LAN network (IEEE 802.11) and another network (e.g., 802.X).

In the BSS illustrated in the FIG. 1(A), a network between the APs 110 and 130 and a network between the APs 110 and 130 and the STAs 100-1, 105-1, and 105-2 may be implemented.

FIG. 1(B) illustrates a conceptual view illustrating the IBSS.

Referring to FIG. 1(B), a WLAN system 15 of FIG. 1(B) may be capable of performing communication by configuring a network between STAs in the absence of the APs 110 and 130 unlike in FIG. 1(A). When communication is performed by configuring the network also between the STAs in the absence of the AP 110 and 130, the network is defined as an ad-hoc network or an independent basic service set (IBSS).

Referring to the FIG. 1(B), the IBSS is a BSS that operates in an Ad-Hoc mode. Since the IBSS does not include the access point (AP), a centralized management entity that performs a management function at the center does not exist. That is, in the IBSS 15, STAs 150-1, 150-2, 150-3, 155-4, and 155-5 are managed by a distributed manner. In the IBSS, all STAs 150-1, 150-2, 150-3, 155-4, and 155-5 may be constituted as movable STAs and are not permitted to access the DS to constitute a self-contained network.

The STA as a predetermined functional medium that includes a medium access control (MAC) that follows a regulation of an Institute of Electrical and Electronics Engineers (IEEE) 802.11 standard and a physical layer interface for a radio medium may be used as a meaning including all of the APs and the non-AP stations (STAs).

The STA may be called various a name such as a mobile terminal, a wireless device, a wireless transmit/receive unit (WTRU), user equipment (UE), a mobile station (MS), a mobile subscriber unit, or just a user.

FIG. 2 is a diagram illustrating an example of a PPDU used in an IEEE standard.

As illustrated in FIG. 2, various types of PHY protocol data units (PPDUs) may be used in a standard such as IEEE a/g/n/ac, etc. In detail, LTF and STF fields include a training signal, SIG-A and SIG-B include control information for a receiving station, and a data field includes user data corresponding to a PSDU.

In the embodiment, an improved technique is provided, which is associated with a signal (alternatively, a control information field) used for the data field of the PPDU. The signal provided in the embodiment may be applied onto high efficiency PPDU (HE PPDU) according to an IEEE 802.11ax standard. That is, the signal improved in the embodiment may be HE-SIG-A and/or HE-SIG-B included in the HE PPDU. The HE-SIG-A and the HE-SIG-B may be represented even as the SIG-A and SIG-B, respectively. However, the improved signal proposed in the embodiment is not particularly limited to an HE-SIG-A and/or HE-SIG-B standard and may be applied to control/data fields having various names, which include the control information in a wireless communication system transferring the user data.

Figure 3:
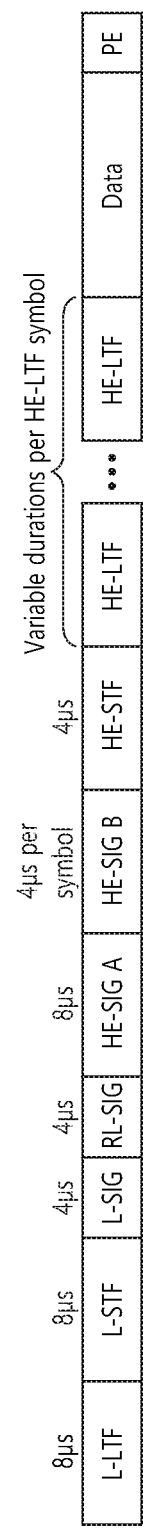
FIG. 3 is a diagram illustrating an example of an HE PDDU.

FIG. 3 is a diagram illustrating an example of an HE PDDU.

The control information field provided in the embodiment may be the HE-SIG-B included in the HE PPDU. The HE PPDU according to FIG. 3 is one example of the PPDU for multiple users and only the PPDU for the multiple users may include the HE-SIG-B and the corresponding HE SIG-B may be omitted in a PPDU for a single user.

As illustrated in FIG. 3, the HE-PPDU for multiple users (MUs) may include a legacy-short training field (L-STF), a legacy-long training field (L-LTF), a legacy-signal (L-SIG), a high efficiency-signal A (HE-SIG A), a high efficiency-signal-B (HE-SIG B), a high efficiency-short training field (HE-STF), a high efficiency-long training field (HE-LTF), a data field (alternatively, an MAC payload), and a packet extension (PE) field. The respective fields may be transmitted during an illustrated time period (that is, 4 or 8 μs).

More detailed description of the respective fields of FIG. 3 will be made below.

Figure 4:
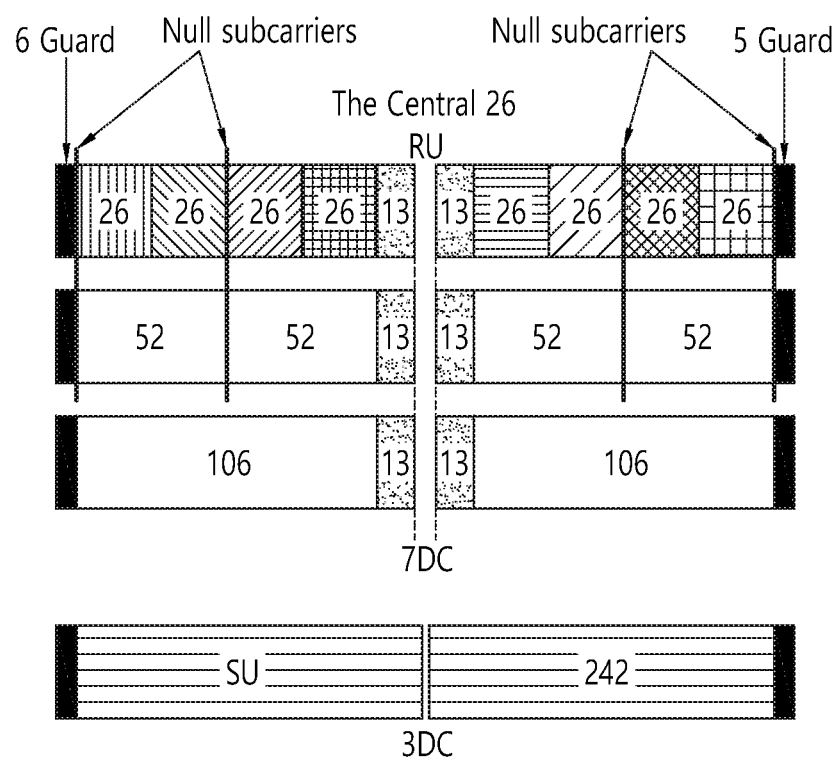
FIG. 4 is a diagram illustrating a layout of resource units used in a band of 20 MHz.

FIG. 4 is a diagram illustrating a layout of resource units (RUs) used in a band of 20 MHz.

As illustrated in FIG. 4, resource units (RUs) corresponding to tone (that is, subcarriers) of different numbers are used to constitute some fields of the HE-PPDU. For example, the resources may be allocated by the unit of the RU illustrated for the HE-STF, the HE-LTF, and the data field.

As illustrated in an uppermost part of FIG. 4, 26 units (that is, units corresponding to 26 tones). 6 tones may be used as a guard band in a leftmost band of the 20 MHz band and 5 tones may be used as the guard band in a rightmost band of the 20 MHz band. Further, 7 DC tones may be inserted into a center band, that is, a DC band and a 26-unit corresponding to each 13 tones may be present at left and right sides of the DC band. The 26-unit, a 52-unit, and a 106-unit may be allocated to other bands. Each unit may be allocated for a receiving station, that is, a user.

Meanwhile, the RU layout of FIG. 4 may be used even in a situation for a single user (SU) in addition to the multiple users (MUs) and in this case, as illustrated in a lowermost part of FIG. 4, one 242-unit may be used and in this case, three DC tones may be inserted.

In one example of FIG. 4, RUs having various sizes, that is, a 26-RU, a 52-RU, a 106-RU, a 242-RU, and the like are proposed, and as a result, since detailed sizes of the RUs may extend or increase, the embodiment is not limited to a detailed size (that is, the number of corresponding tones) of each RU.

Figure 5:
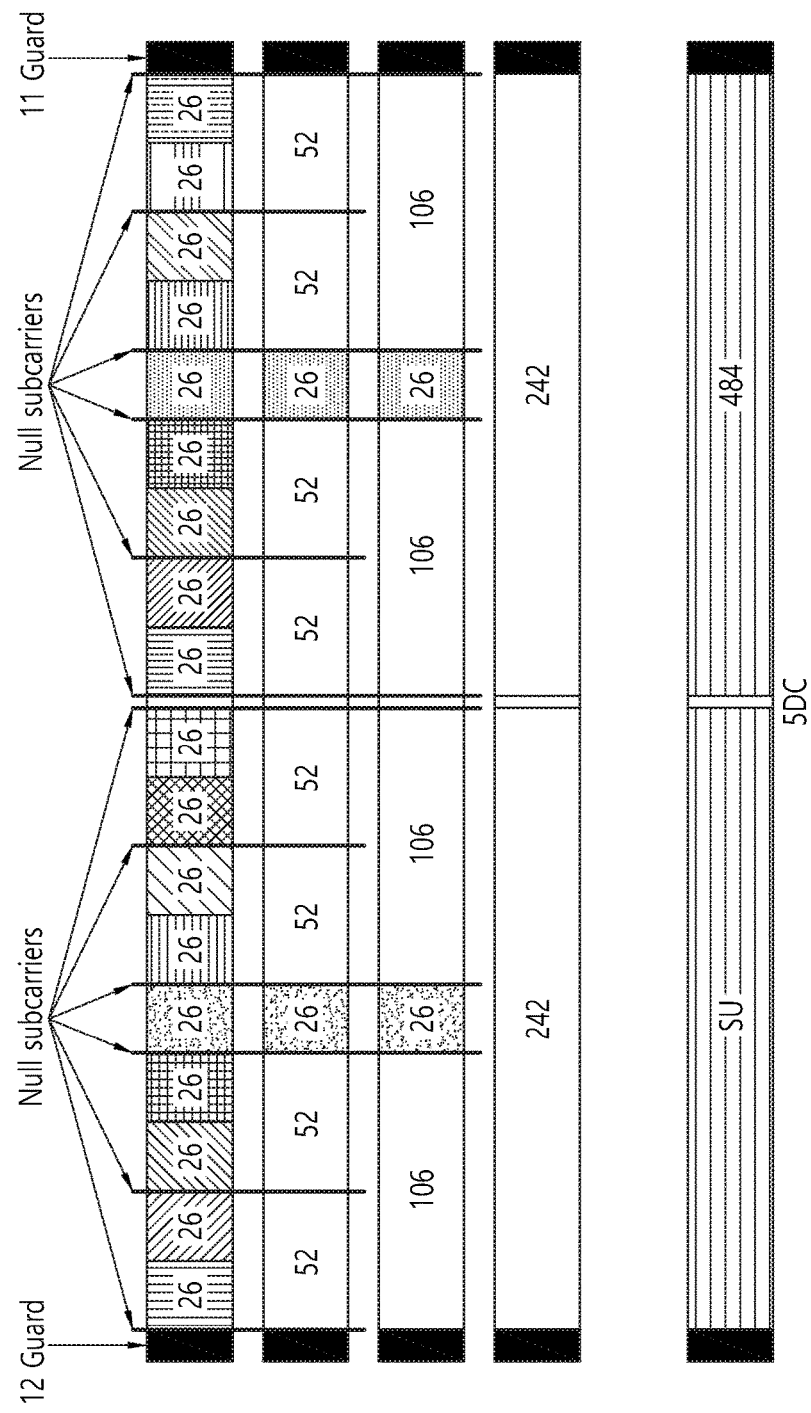
FIG. 5 is a diagram illustrating a layout of resource units used in a band of 40 MHz.

FIG. 5 is a diagram illustrating a layout of resource units (RUs) used in a band of 40 MHz.

Similarly to a case in which the RUs having various RUs are used in one example of FIG. 4, 26-RU, 52-RU, 106-RU, 242-RU, 484-RU, and the like may be used even in one example of FIG. 5. Further, 5 DC tones may be inserted into a center frequency, 12 tones may be used as the guard band in the leftmost band of the 40 MHz band and 11 tones may be used as the guard band in the rightmost band of the 40 MHz band.

In addition, as illustrated in FIG. 5, when the RU layout is used for the single user, the 484-RU may be used. That is, the detailed number of RUs may be modified similarly to one example of FIG. 4.

Figure 6:
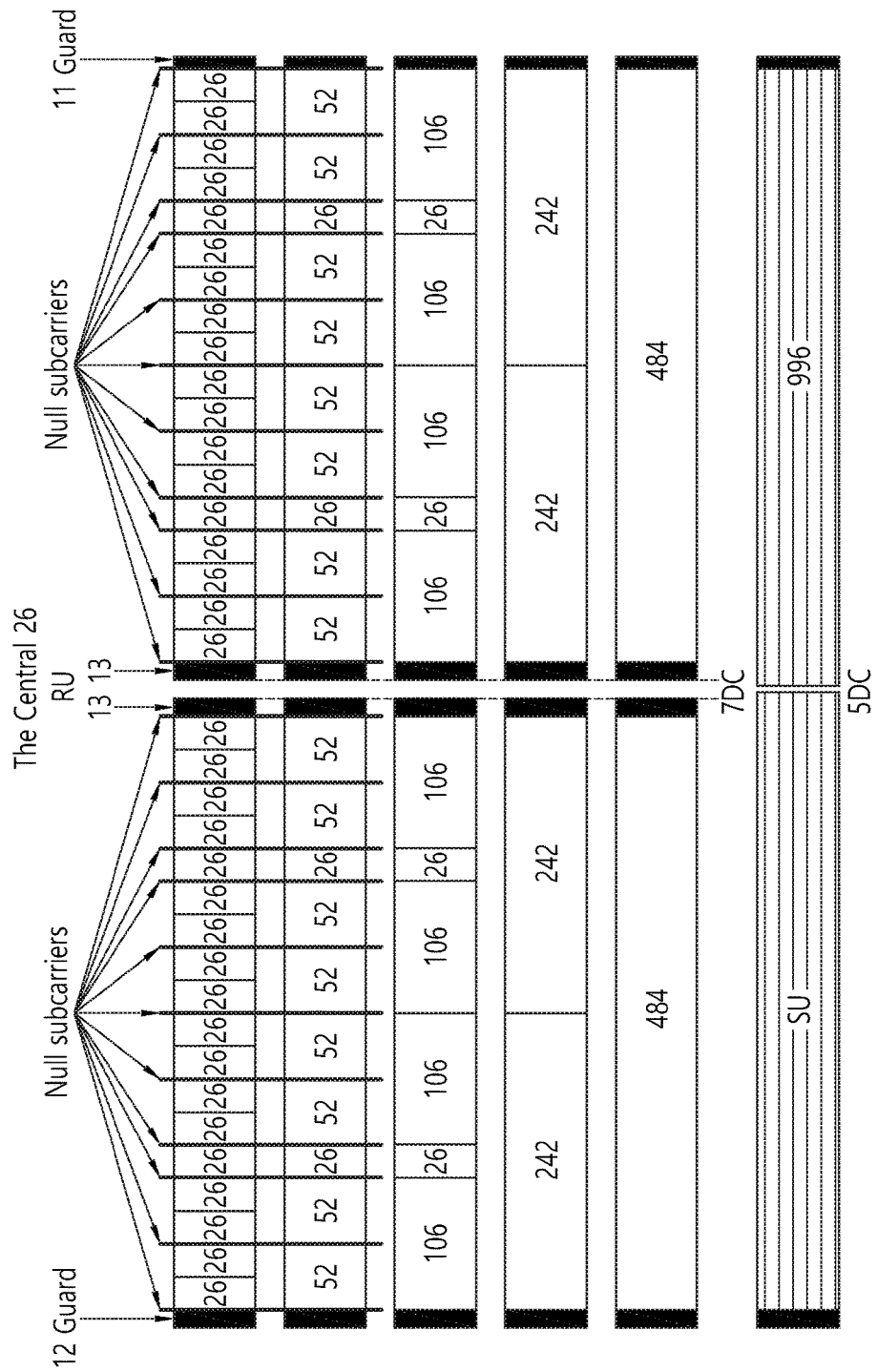
FIG. 6 is a diagram illustrating a layout of resource units used in a band of 80 MHz.

FIG. 6 is a diagram illustrating a layout of resource units (RUs) used in a band of 80 MHz.

Similarly to a case in which the RUs having various RUs are used in one example of each of FIG. 4 or 5, 26-RU, 52-RU, 106-RU, 242-RU, 484-RU, and the like may be used even in one example of FIG. 6. Further, 7 DC tones may be inserted into the center frequency, 12 tones may be used as the guard band in the leftmost band of the 80 MHz band and 11 tones may be used as the guard band in the rightmost band of the 80 MHz band. In addition, the 26-RU may be used, which uses 13 tones positioned at each of left and right sides of the DC band.

Moreover, as illustrated in FIG. 6, when the RU layout is used for the single user, 996-RU may be used and in this case, 5 DC tones may be inserted. Meanwhile, the detailed number of RUs may be modified similarly to one example of each of FIG. 4 or 5.

Figure 7:
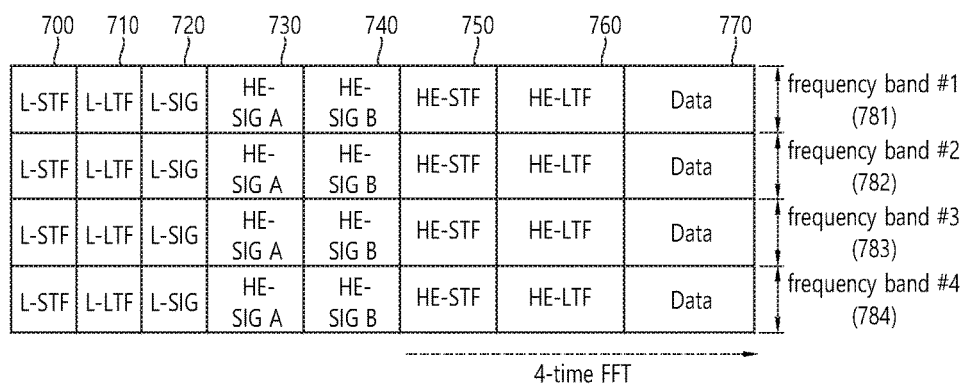
FIG. 7 is a diagram illustrating another example of the HE PPDU.

FIG. 7 is a diagram illustrating another example of the HE PPDU.

A block illustrated in FIG. 7 is another example of describing the HE-PPDU block of FIG. 3 in terms of a frequency.

An illustrated L-STF 700 may include a short training orthogonal frequency division multiplexing (OFDM) symbol. The L-STF 700 may be used for frame detection, automatic gain control (AGC), diversity detection, and coarse frequency/time synchronization.

An L-LTF 710 may include a long training orthogonal frequency division multiplexing (OFDM) symbol. The L-LTF 710 may be used for fine frequency/time synchronization and channel prediction.

An L-SIG 720 may be used for transmitting control information. The L-SIG 720 may include information regarding a data rate and a data length. Further, the L-SIG 720 may be repeatedly transmitted. That is, a new format, in which the L-SIG 720 is repeated (for example, may be referred to as R-LSIG) may be configured.

An HE-SIG-A 730 may include the control information common to the receiving station.

In detail, the HE-SIG-A 730 may include information on 1) a DL/UL indicator, 2) a BSS color field indicating an identify of a BSS, 3) a field indicating a remaining time of a current TXOP period, 4) a bandwidth field indicating at least one of 20, 40, 80, 160 and 80+80 MHz, 5) a field indicating an MCS technique applied to the HE-SIG-B, 6) an indication field regarding whether the HE-SIG-B is modulated by a dual subcarrier modulation technique for MCS, 7) a field indicating the number of symbols used for the HE-SIG-B, 8) a field indicating whether the HE-SIG-B is configured for a full bandwidth MIMO transmission, 9) a field indicating the number of symbols of the HE-LTF, 10) a field indicating the length of the HE-LTF and a CP length, 11) a field indicating whether an OFDM symbol is present for LDPC coding, 12) a field indicating control information regarding packet extension (PE), 13) a field indicating information on a CRC field of the HE-SIG-A, and the like. A detailed field of the HE-SIG-A may be added or partially omitted. Further, some fields of the HE-SIG-A may be partially added or omitted in other environments other than a multi-user (MU) environment An HE-SIG-B 740 may be included only in the case of the PPDU for the multiple users (MUs) as described above. Principally, an HE-SIG-A 750 or an HE-SIG-B 760 may include resource allocation information (alternatively, virtual resource allocation information) for at least one receiving STA.

The HE-SIG-B 740 will be described below in a greater detail with reference to FIG. 8.

A previous field of the HE-SIG-B 740 may be transmitted in a duplicated form on an MU PPDU. In the case of the HE-SIG-B 740, the HE-SIG-B 740 transmitted in some frequency band (e.g., a fourth frequency band) may even include control information for a data field corresponding to a corresponding frequency band (that is, the fourth frequency band) and a data field of another frequency band (e.g., a second frequency band) other than the corresponding frequency band. Further, a format may be provided, in which the HE-SIG-B 740 in a specific frequency band (e.g., the second frequency band) is duplicated with the HE-SIG-B 740 of another frequency band (e.g., the fourth frequency band). Alternatively, the HE-SIG B 740 may be transmitted in an encoded form on all transmission resources. A field after the HE-SIG B 740 may include individual information for respective receiving STAs receiving the PPDU.

The HE-STF 750 may be used for improving automatic gain control estimation in a multiple input multiple output (MIMO) environment or an OFDMA environment.

The HE-LTF 760 may be used for estimating a channel in the MIMO environment or the OFDMA environment.

The size of fast Fourier transform (FFT)/inverse fast Fourier transform (IFFT) applied to the HE-STF 750 and the field after the HE-STF 750, and the size of the FFT/IFFT applied to the field before the HE-STF 750 may be different from each other. For example, the size of the FFT/IFFT applied to the HE-STF 750 and the field after the HE-STF 750 may be four times larger than the size of the FFT/IFFT applied to the field before the HE-STF 750.

For example, when at least one field of the L-STF 700, the L-LTF 710, the L-SIG 720, the HE-SIG-A 730, and the HE-SIG-B 740 on the PPDU of FIG. 7 is referred to as a first field, at least one of the data field 770, the HE-STF 750, and the HE-LTF 760 may be referred to as a second field. The first field may include a field associated with a legacy system and the second field may include a field associated with an HE system. In this case, the fast Fourier transform (FFT) size and the inverse fast Fourier transform (IFFT) size may be defined as a size which is N (N is a natural number, e.g., N=1, 2, and 4) times larger than the FFT/IFFT size used in the legacy wireless LAN system. That is, the FFT/IFFT having the size may be applied, which is N (=4) times larger than the first field of the HE PPDU. For example, 256 FFT/IFFT may be applied to a bandwidth of 20 MHz, 512 FFT/IFFT may be applied to a bandwidth of 40 MHz, 1024 FFT/IFFT may be applied to a bandwidth of 80 MHz, and 2048 FFT/IFFT may be applied to a bandwidth of continuous 160 MHz or discontinuous 160 MHz.

In other words, a subcarrier space/subcarrier spacing may have a size which is 1/N times (N is the natural number, e.g., N=4, the subcarrier spacing is set to 78.125 kHz) the subcarrier space used in the legacy wireless LAN system. That is, subcarrier spacing having a size of 312.5 kHz, which is legacy subcarrier spacing may be applied to the first field of the HE PPDU and a subcarrier space having a size of 78.125 kHz may be applied to the second field of the HE PPDU.

Alternatively, an IDFT/DFT period applied to each symbol of the first field may be expressed to be N (=4) times shorter than the IDFT/DFT period applied to each data symbol of the second field. That is, the IDFT/DFT length applied to each symbol of the first field of the HE PPDU may be expressed as 3.2 μs and the IDFT/DFT length applied to each symbol of the second field of the HE PPDU may be expressed as 3.2 μs*4 (=12.8 μs). The length of the OFDM symbol may be a value acquired by adding the length of a guard interval (GI) to the IDFT/DFT length. The length of the GI may have various values such as 0.4 μs, 0.8 μs, 1.6 μs, 2.4 μs, and 3.2 μs.

For simplicity in the description, in FIG. 7, it is expressed that a frequency band used by the first field and a frequency band used by the second field accurately coincide with each other, but both frequency bands may not completely coincide with each other, in actual. For example, a primary band of the first field (L-STF, L-LTF, L-SIG, HE-SIG-A, and HE-SIG-B) corresponding to the first frequency band may be the same as the most portions of a frequency band of the second field (HE-STF, HE-LTF, and Data), but boundary surfaces of the respective frequency bands may not coincide with each other. As illustrated in FIGS. 4 to 6, since multiple null subcarriers, DC tones, guard tones, and the like are inserted during arranging the RUs, it may be difficult to accurately adjust the boundary surfaces.

The user (e.g., a receiving station) may receive the HE-SIG-A 730 and may be instructed to receive the downlink PPDU based on the HE-SIG-A 730. In this case, the STA may perform decoding based on the FFT size changed from the HE-STF 750 and the field after the HE-STF 750. On the contrary, when the STA may not be instructed to receive the downlink PPDU based on the HE-SIG-A 730, the STA may stop the decoding and configure a network allocation vector (NAV). A cyclic prefix (CP) of the HE-STF 750 may have a larger size than the CP of another field and the during the CP period, the STA may perform the decoding for the downlink PPDU by changing the FFT size.

Hereinafter, in the embodiment of the present invention, data (alternatively, or a frame) which the AP transmits to the STA may be expressed as a terms called downlink data (alternatively, a downlink frame) and data (alternatively, a frame) which the STA transmits to the AP may be expressed as a term called uplink data (alternatively, an uplink frame). Further, transmission from the AP to the STA may be expressed as downlink transmission and transmission from the STA to the AP may be expressed as a term called uplink transmission.

In addition, a PHY protocol data unit (PPDU), a frame, and data transmitted through the downlink transmission may be expressed as terms such as a downlink PPDU, a downlink frame, and downlink data, respectively. The PPDU may be a data unit including a PPDU header and a physical layer service data unit (PSDU) (alternatively, a MAC protocol data unit (MPDU)). The PPDU header may include a PHY header and a PHY preamble and the PSDU (alternatively, MPDU) may include the frame or indicate the frame (alternatively, an information unit of the MAC layer) or be a data unit indicating the frame. The PHY header may be expressed as a physical layer convergence protocol (PLCP) header as another term and the PHY preamble may be expressed as a PLCP preamble as another term.

Further, a PPDU, a frame, and data transmitted through the uplink transmission may be expressed as terms such as an uplink PPDU, an uplink frame, and uplink data, respectively.

In the wireless LAN system to which the embodiment of the present description is applied, the whole bandwidth may be used for downlink transmission to one STA and uplink transmission to one STA. Further, in the wireless LAN system to which the embodiment of the present description is applied, the AP may perform downlink (DL) multi-user (MU) transmission based on multiple input multiple output (MU MIMO) and the transmission may be expressed as a term called DL MU MIMO transmission.

In addition, in the wireless LAN system according to the embodiment, an orthogonal frequency division multiple access (OFDMA) based transmission method is preferably supported for the uplink transmission and/or downlink transmission. That is, data units (e.g., RUs) corresponding to different frequency resources are allocated to the user to perform uplink/downlink communication. In detail, in the wireless LAN system according to the embodiment, the AP may perform the DL MU transmission based on the OFDMA and the transmission may be expressed as a term called DL MU OFDMA transmission. When the DL MU OFDMA transmission is performed, the AP may transmit the downlink data (alternatively, the downlink frame and the downlink PPDU) to the plurality of respective STAs through the plurality of respective frequency resources on an overlapped time resource. The plurality of frequency resources may be a plurality of subbands (alternatively, sub channels) or a plurality of resource units (RUs). The DL MU OFDMA transmission may be used together with the DL MU MIMO transmission. For example, the DL MU MIMO transmission based on a plurality of space-time streams (alternatively, spatial streams) may be performed on a specific subband (alternatively, sub channel) allocated for the DL MU OFDMA transmission.

Further, in the wireless LAN system according to the embodiment, uplink multi-user (UL MU) transmission in which the plurality of STAs transmits data to the AP on the same time resource may be supported. Uplink transmission on the overlapped time resource by the plurality of respective STAs may be performed on a frequency domain or a spatial domain.

When the uplink transmission by the plurality of respective STAs is performed on the frequency domain, different frequency resources may be allocated to the plurality of respective STAs as uplink transmission resources based on the OFDMA. The different frequency resources may be different subbands (alternatively, sub channels) or different resources units (RUs). The plurality of respective STAs may transmit uplink data to the AP through different frequency resources. The transmission method through the different frequency resources may be expressed as a term called a UL MU OFDMA transmission method.

When the uplink transmission by the plurality of respective STAs is performed on the spatial domain, different time-space streams (alternatively, spatial streams) may be allocated to the plurality of respective STAs and the plurality of respective STAs may transmit the uplink data to the AP through the different time-space streams. The transmission method through the different spatial streams may be expressed as a term called a UL MU MIMO transmission method.

The UL MU OFDMA transmission and the UL MU MIMO transmission may be used together with each other. For example, the UL MU MIMO transmission based on the plurality of space-time streams (alternatively, spatial streams) may be performed on a specific subband (alternatively, sub channel) allocated for the UL MU OFDMA transmission.

In the legacy wireless LAN system which does not support the MU OFDMA transmission, a multi-channel allocation method is used for allocating a wider bandwidth (e.g., a 20 MHz excess bandwidth) to one terminal. When a channel unit is 20 MHz, multiple channels may include a plurality of 20 MHz-channels. In the multi-channel allocation method, a primary channel rule is used to allocate the wider bandwidth to the terminal. When the primary channel rule is used, there is a limit for allocating the wider bandwidth to the terminal. In detail, according to the primary channel rule, when a secondary channel adjacent to a primary channel is used in an overlapped BSS (OBSS) and is thus busy, the STA may use remaining channels other than the primary channel. Therefore, since the STA may transmit the frame only to the primary channel, the STA receives a limit for transmission of the frame through the multiple channels. That is, in the legacy wireless LAN system, the primary channel rule used for allocating the multiple channels may be a large limit in obtaining a high throughput by operating the wider bandwidth in a current wireless LAN environment in which the OBSS is not small.

In order to solve the problem, in the embodiment, a wireless LAN system is disclosed, which supports the OFDMA technology. That is, the OFDMA technique may be applied to at least one of downlink and uplink. Further, the MU-MIMO technique may be additionally applied to at least one of downlink and uplink. When the OFDMA technique is used, the multiple channels may be simultaneously used by not one terminal but multiple terminals without the limit by the primary channel rule. Therefore, the wider bandwidth may be operated to improve efficiency of operating a wireless resource.

As described above, in case the uplink transmission performed by each of the multiple STAs (e.g., non-AP STAs) is performed within the frequency domain, the AP may allocate different frequency resources respective to each of the multiple STAs as uplink transmission resources based on OFDMA. Additionally, as described above, the frequency resources each being different from one another may correspond to different subbands (or sub-channels) or different resource units (RUs).

The different frequency resources respective to each of the multiple STAs are indicated through a trigger frame.

Figure 8:
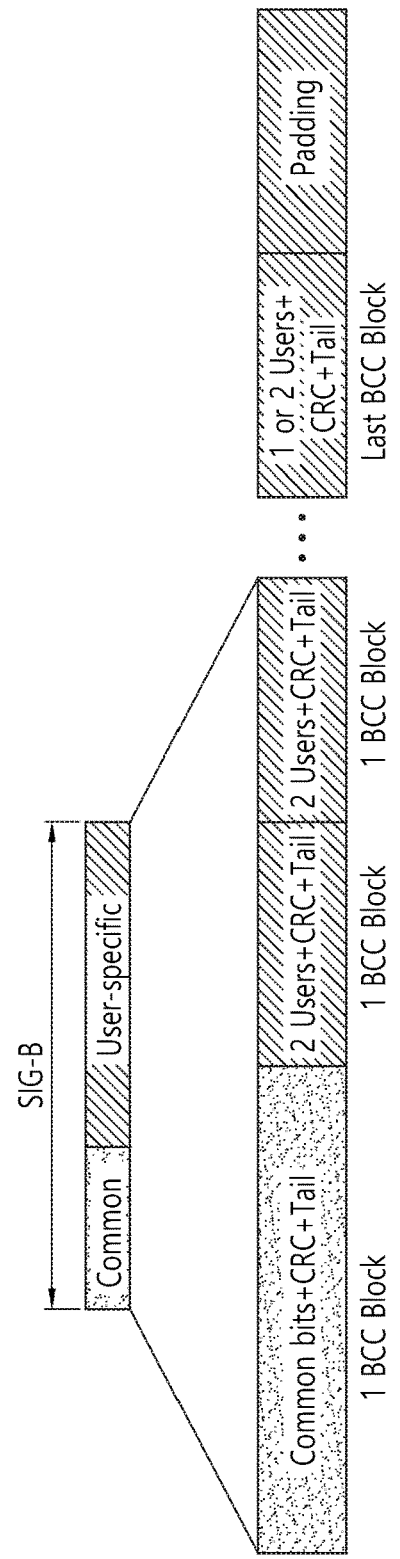
FIG. 8 is a block diagram illustrating one example of HE-SIG-B according to an embodiment.

FIG. 8 is a block diagram illustrating one example of HE-SIG-B according to an embodiment.

As illustrated in FIG. 8, the HE-SIG-B field includes a common field at a frontmost part and the corresponding common field is separated from a field which follows therebehind to be encoded. That is, as illustrated in FIG. 8, the HE-SIG-B field may include a common field including the common control information and a user-specific field including user-specific control information. In this case, the common field may include a CRC field corresponding to the common field, and the like and may be coded to be one BCC block. The user-specific field subsequent thereafter may be coded to be one BCC block including the "user-specific field" for 2 users and a CRC field corresponding thereto as illustrated in FIG. 8.

Figure 9:
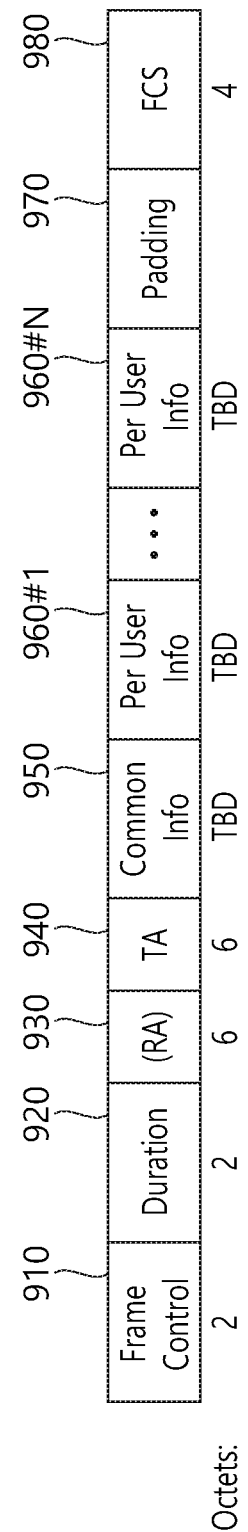
FIG. 9 illustrates an example of a trigger frame.

FIG. 9 illustrates an example of a trigger frame. The trigger frame of FIG. 9 allocates resources for Uplink Multiple-User (MU) transmission and may be transmitted from the AP. The trigger frame may be configured as a MAC frame and may be included in the PPDU. For example, the trigger frame may be transmitted through the PPDU shown in FIG. 3, through the legacy PPDU shown in FIG. 2, or through a certain PPDU, which is newly designed for the corresponding trigger frame. In case the trigger frame is transmitted through the PPDU of FIG. 3, the trigger frame may be included in the data field shown in the drawing.

Each of the fields shown in FIG. 9 may be partially omitted, or other fields may be added. Moreover, the length of each field may be varied differently as shown in the drawing.

A Frame Control field 910 shown in FIG. 9 may include information related to a version of the MAC protocol and other additional control information, and a Duration field 920 may include time information for configuring a NAV or information related to an identifier (e.g., AID) of the user equipment.

In addition, the RA field 930 may include address information of the receiving STA of a corresponding trigger frame, and may be optionally omitted. The TA field 940 includes address information of an STA (e.g., AP) for transmitting the trigger frame, and the common information field 950 includes common control information applied to the receiving STA for receiving the trigger frame.

It is preferable that the trigger frame of FIG. 9 includes per user information fields 960#1 to 960#N corresponding to the number of receiving STAs receiving the trigger frame of FIG. 9. The per user information field may also be referred to as a "RU Allocation field".

Additionally, the trigger frame of FIG. 9 may include a Padding field 970 and a Sequence field 980.

It is preferable that each of the per user information fields 960#1 to 960#N shown in FIG. 9 further includes multiple sub-fields.

Figure 10:
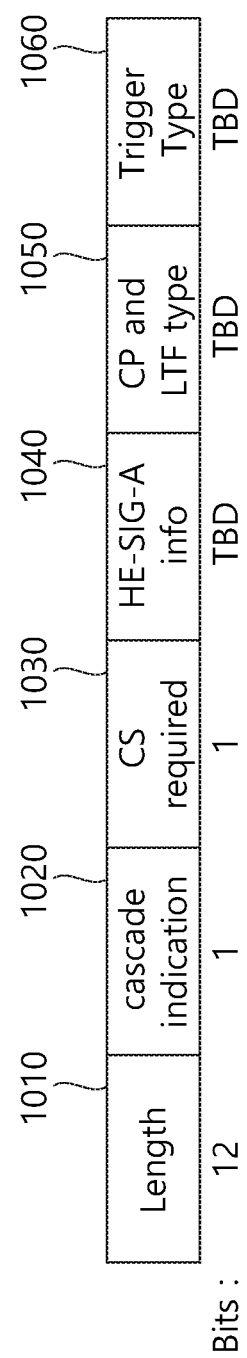
FIG. 10 illustrates an example of a sub-field included in a per user information field.

FIG. 10 illustrates an example of a sub-field included in a per user information field. Some parts of the sub-field of FIG. 10 may be omitted, and extra sub-fields may be added. Further, a length of each of the sub-fields shown herein may change.

As shown in the drawing, the Length field 1010 may be given that same value as the Length field of the L-SIG field of the uplink PPDU, which is transmitted in response to the corresponding trigger frame, and the Length field of the L-SIG field of the uplink PPDU indicates the length of the uplink PPDU. As a result, the Length field 1010 of the trigger frame may be used for indicating the length of its respective uplink PPDU.

Additionally, a Cascade Indicator field 1020 indicates whether or not a cascade operation is performed. The cascade operation refers to a downlink MU transmission and an uplink MU transmission being performed simultaneously within the same TXOP. More specifically, this refers to a case when a downlink MU transmission is first performed, and, then, after a predetermined period of time (e.g., SIFS), an uplink MU transmission is performed. During the cascade operation, only one transmitting device performing downlink communication (e.g., AP) may exist, and multiple transmitting devices performing uplink communication (e.g., non-AP) may exist.

A CS Request field 1030 indicates whether or not the status or NAV of a wireless medium is required to be considered in a situation where a receiving device that has received the corresponding trigger frame transmits the respective uplink PPDU.

A HE-SIG-A information field 1040 may include information controlling the content of a SIG-A field (i.e., HE-SIG-A field) of an uplink PPDU, which is being transmitted in response to the corresponding trigger frame.

A CP and LTF type field 1050 may include information on a LTF length and a CP length of the uplink PPDU being transmitted in response to the corresponding trigger frame. A trigger type field 1060 may indicate a purpose for which the corresponding trigger frame is being used, e.g., general triggering, triggering for beamforming, and so on, a request for a Block ACK/NACK, and so on.

Figure 11:
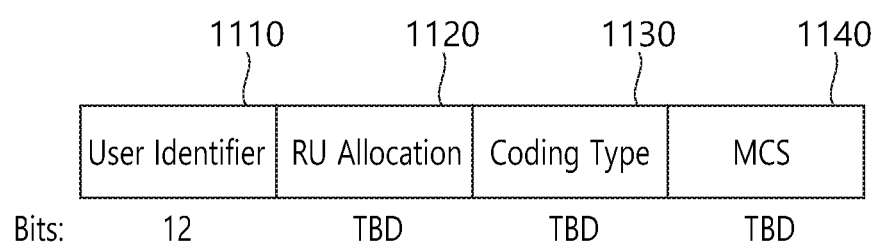
FIG. 11 illustrates an example of a sub-field being included in a per user information field.

FIG. 11 illustrates an example of a sub-field being included in a per user information field. Among the sub-fields of FIG. 11, some may be omitted, and other additional sub-fields may also be added. Additionally, the length of each of the sub-fields shown in the drawing may be varied.

A User Identifier field 1110 indicates an identifier of an STA (i.e., receiving STA) to which the per user information corresponds, and an example of the identifier may correspond to all or part of the AID.

In the present specification, the user identifier field of FIG. 11 may be referred to as an association identifier (hereinafter, AID) field.

Additionally, a RU Allocation field 1120 may be included in the sub-field of the per user information field. More specifically, in case a receiving STA, which is identified by the User Identifier field 1110, transmits an uplink PPDU in response to the trigger frame of FIG. 9, the corresponding uplink PPDU is transmitted through the RU, which is indicated by the RU Allocation field 1120. In this case, it is preferable that the RU that is being indicated by the RU Allocation field 1120 corresponds to the RU shown in FIG. 4, FIG. 5, and FIG. 6.

The sub-field of FIG. 11 may include a Coding Type field 1130. The Coding Type field 1130 may indicate a coding type of the uplink PPDU being transmitted in response to the trigger frame of FIG. 9. For example, in case BBC coding is applied to the uplink PPDU, the Coding Type field 1130 may be set to '1', and, in case LDPC coding is applied to the uplink PPDU, the Coding Type field 1130 may be set to '0'. Subframe Additionally, the sub-field of FIG. 11 may include a MCS field 1140. The MCS field 1140 may indicate a MCS scheme being applied to the uplink PPDU that is transmitted in response to the trigger frame of FIG. 9.

For example, when BCC coding may is applied to the uplink PPDU, the coding type field 1130 may be set to '1', and when the LDPC coding is applied, the coding type field 1130 may be set to '0'.

Figure 12:
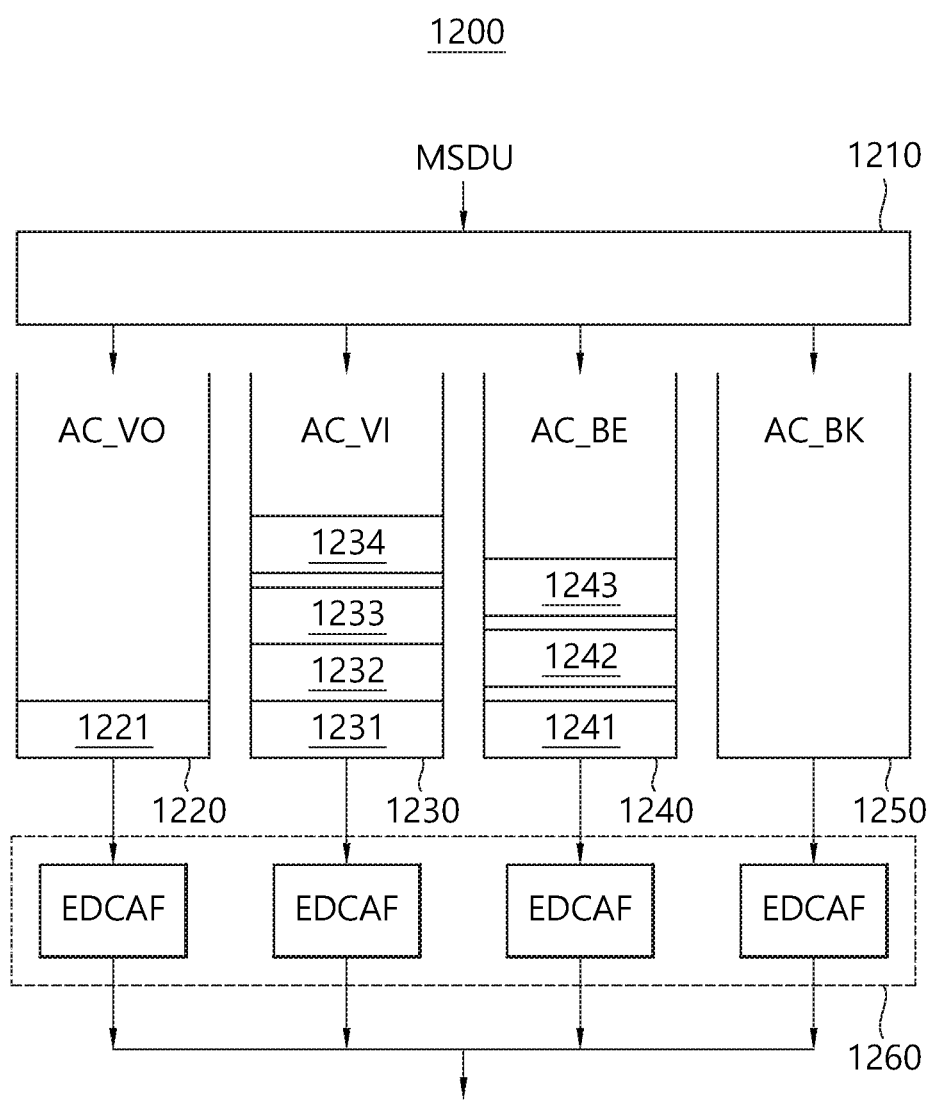
FIG. 12 illustrates an EDCA-based channel access method in a WLAN system.

FIG. 12 illustrates an EDCA-based channel access method in a WLAN system. In the WLAN system, an STA (or AP) performing enhanced distributed channel access (EDCA) may perform channel access according to a plurality of user priorities defined with respect to traffic data.

Specifically, for the transmission of quality of service (QoS) data frames based on a plurality of user priorities, four access categories (ACs: AC_BK (background), AC_BE (best effort), AC_VI (video), and AC_VO (voice)) may be defined.

The STA may receive traffic data (for example, an MAC service data unit (MSDU)) with a differential user priority from a logical link control (LLC) layer. The user priority of traffic data forwarded from the LLC layer to an MAC layer may be mapped as in Table 1.

TABLE 1

| Priority | User priority | Access category (AC) |
|---|---|---|
| Low | 1 | AC_BK |
|  | 2 | AC_BK |
|  | 0 | AC_BE |
|  | 3 | AC_BE |
|  | 4 | AC_VI |
|  | 5 | AC_VI |
|  | 6 | AC_VO |
| High | 7 | AC_VO |

Referring to Table 1, traffic data with user priority 1 or 2 may be buffered as an AC_BK-type transmission queue 1250. Traffic data with user priority 0 or 3 may be buffered as an AC_BE-type transmission queue 1240. Traffic data with user priority 4 or 5 may be buffered to as an AC_VI-type transmission queue 1230. Traffic data with user priority 6 or 7 may be buffered as an AC_VO-type transmission queue 1220.

Instead of parameters for a conventional distributed coordination function (DCF)-based backoff procedure, which are DCF interframe space (DIFS), CWmin, and CWmax, an EDCA parameter set of arbitration interframe space (AIFS) [AC], CWmin[AC], CWmax[AC], and TXOP limit[AC] may be used for a backoff procedure of the STA performing EDCA.

The ACs may have different transmission priorities based on differential EDCA parameter sets. Default values of an EDCA parameter set (that is, AIFS[AC], CWmin[AC], CWmax[AC], and TXOP limit[AC]) corresponding to each AC are illustrated in Table 2.

TABLE 2

| AC | CWmin[AC] | CWmax[AC] | AIFS[AC] | TXOP limit[AC] |
|---|---|---|---|---|
| AC_BK | 31 | 1023 | 7 | 0 |
| AC_BE | 31 | 1023 | 3 | 0 |
| AC_VI | 15 | 31 | 2 | 3.008 ms |
| AC_VO | 7 | 15 | 2 | 1.504 ms |

An EDCA parameter set for each AC may be set to a default value or may be forwarded from an AP to each STA via a beacon frame. The ACs have a higher priority as AIFS[AC] and CWmin[AC] have lower values. Accordingly, a delay in channel access is reduced, making it possible to use a greater band in a given traffic environment.

The EDCA parameter set may include information on a channel access parameter (for example, AIFS[AC], CWmin[AC], and CWmax[AC]) for each AC.

The backoff procedure for EDCA may be performed based on an EDCA parameter set which is individually set for the four ACs included in each STA. When EDCA parameter values that define different channel access parameters for the respective ACs are properly set, network performance may be optimized and transmission effect by the priority of traffic may be increased.

Therefore, the AP of the WLAN system needs to perform overall management and coordination functions on the EDCA parameters in order to guarantee fair medium access for all STAs participating in a network.

Referring to FIG. 12, one STA (or AP) 1200 may include a virtual mapper 1210, a plurality of transmission queues 1220 to 1250, and a virtual collision handler 1260. The virtual mapper 1210 of FIG. 12 may serve to map an MSDU received from the logical link control (LLC) layer to a transmission queue corresponding to each AC according to Table 1.

The plurality of transmission queues 1220 to 1250 of FIG. 12 may serve as an individual EDCA contention entity for channel access to a wireless medium within one STA (or AP).

For example, an AC VO-type transmission queue 1220 of FIG. 12 may include one frame 1221 for a second STA (not shown). An AC VI-type transmission queue 1230 may include three frames 1231 to 1233 for a first STA (not shown) and one frame 1234 for a third STA according to the order of transmission to a physical layer.

An AC BE-type transmission queue 1240 of FIG. 12 may include one frame 1241 for the second STA (not shown), one frame 1242 for the third STA (not shown), and one frame 1243 for the second STA (not shown) according to the order of transmission to the physical layer. For example, an AC BK-type transmission queue 1250 of FIG. 12 may not include a frame to be transmitted to the physical layer.

For example, internal backoff values for the AC VO-type transmission queue 1220, the AC VI-type transmission queue 1230, the AC BE-type transmission queue 1240, and the AC BK-type transmission queue 1250 may be individually computed based on Equation 1 and a channel access parameter set (that is, AIFS[AC], CWmin[AC], and CWmax [AC] in Table 2) for each AC.

The STA 1200 may perform an internal backoff procedure based on the internal backoff values for the respective transmission queue 1220, 1230, 1240, and 1250. In this case, a transmission queue of which the internal backoff procedure is first completed may be construed as a transmission queue corresponding to a primary AC.

A frame buffered in the transmission queue corresponding to the primary AC may be transmitted to another entity (for example, another STA or AP) during a transmission opportunity (hereinafter, "TXOP"). If the backoff of one or more ACs is finished at the same time, a collision between the ACs may be coordinated according to a function (EDCA function (EDCAF)) included in the virtual collision handler 1260.

That is, when a collision between ACs occurs, a frame buffered in an AC having a higher priority may be transmitted first. Other ACs may increase a contention window value and may update a value set in a backoff count.

When any one frame buffered in the transmission queue of the primary AC is transmitted, the STA may determine whether it is possible to transmit a next frame in the same AC and to receive an ACK of the frame during the remaining TXOP. In this case, the STA attempts to transmit the next frame at a time interval of SIFS.

A TXOP limit value may be set to a default value for the AP and the STA, or a frame associated with the TXOP limit value may be forwarded from the AP to the STA. When a data frame to be transmitted has a size exceeding the TXOP limit value, the AP may fragment the frame into several small frames. Subsequently, the segmented frames may be transmitted as long as the size of the segmented frames does not exceed the TXOP limit value.

Figure 13:
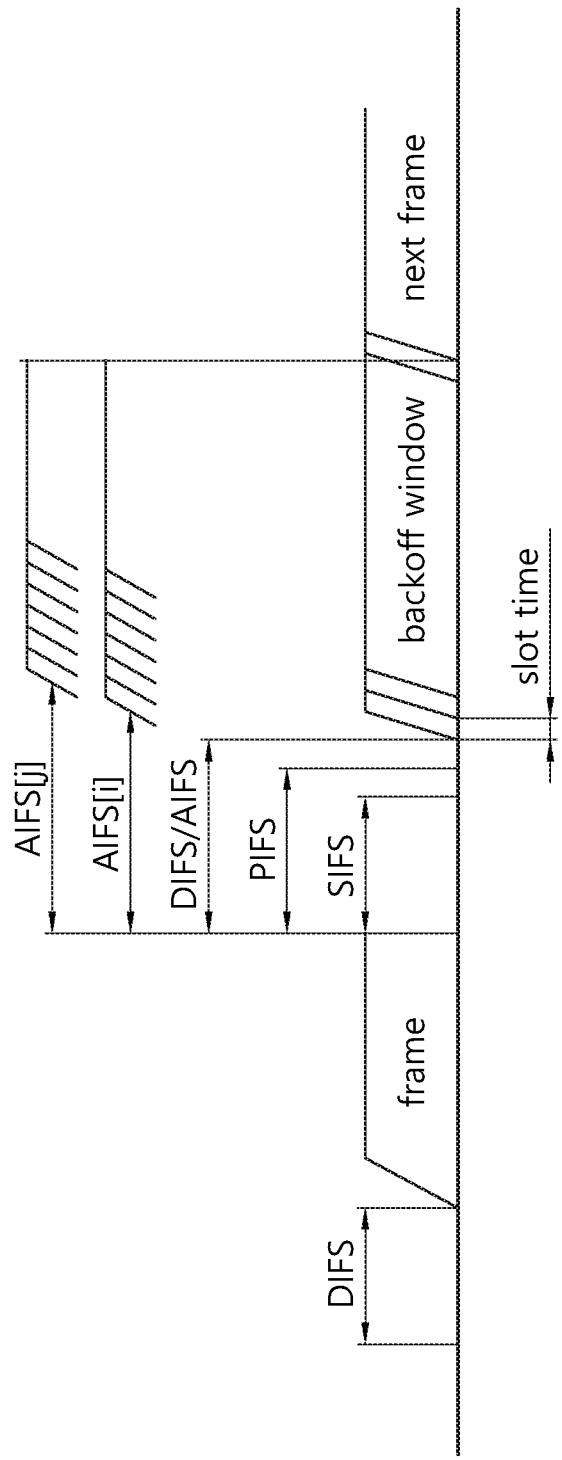
FIG. 13 is a conceptual diagram illustrating a backoff procedure according to EDCA.

FIG. 13 is a conceptual diagram illustrating a backoff procedure according to EDCA.

Each STA may share a wireless medium based on a distributed coordination function (hereinafter, "DCF") as a contention-based function. The DCF is an access protocol for coordinating collisions between STAs and may employ a carrier sense multiple access with collision avoidance (hereinafter, "CSMA/CA").

When it is determined by the DCF that the wireless medium is not occupied (that is, the wireless medium is in the idle state) during a DCF interframe space (DIFS), the STA may obtain a transmission authority to transmit an internally determined MPDU through the wireless medium. For example, the internally determined MPDU may be construed as a frame included in the transmission queue of the primary AC mentioned in FIG. 12.

When it is determined by the DCF that the wireless medium is occupied by another STA (that is, the wireless medium is busy) during the DIFS, the STA may wait until the wireless medium is idle in order to obtain a transmission authority to transmit an internally determined MPDU through the wireless medium.

Subsequently, the STA may defer channel access by the DIFS from the time the wireless medium switches to the idle state. The STA may then wait for a contention window (hereinafter, "CW") set in a backoff counter.

To perform the backoff procedure according to EDCA, each STA may set a backoff value randomly selected within a contention window (CW) in a backoff counter. For example, the backoff value set in the backoff counter of each STA to perform the backoff procedure according to EDCA may be associated with an internal backoff value used in an internal backoff procedure to determine a primary AC of each STA.

Further, the backoff value set in the backoff counter of each STA may be a value newly set in the backoff counter of each STA with respect to a transmission queue of the primary AC of each STA based on Equation 1 and a channel access parameter set (that is, AIFS[AC], CWmin[AC], and CWmax[AC] in Table 2) for each AC.

In the present specification, a time of the backoff value, which is selected by each STA, expressed in slot time units may be construed as a backoff window of FIG. 13.

Each STA may perform a countdown operation of decreasing the backoff window set in the backoff counter in slot time units. Among a plurality of STAs, an STA having a relatively shortest backoff window may acquire a TXOP as a right to occupy the wireless medium.

During a time interval for the TXOP, the remaining STAs may suspend the countdown operation. The remaining STAs may wait until the time interval for the TXOP expires. When the time interval for the TXOP expires, the remaining STAs may resume the suspended countdown operation to occupy the wireless medium.

A DCF-based transmission method may prevent a collision that may occur when a plurality of STAs simultaneously transmits frames. However, a channel access scheme using a DCF has no concept of transmission priority (that is, user priority). That is, when the DCF is used, QoS for traffic transmitted by the STA may not be guaranteed.

To solve this problem, a hybrid coordination function (hereinafter, "HCF") is defined as a new coordination function in 802.11e. The newly defined HCF has higher performance than the channel access performance of the existing DCF. The HCF may employ two channel access schemes together, which are HCF controlled channel access (HCCA) of a polling scheme and contention-based enhanced distributed channel access (EDCA), in order to improve QoS.

Referring to FIG. 13, it may be assumed that the STA attempts to transmit traffic data buffered in the STA. User priorities set for respective traffic data may be differentiated as shown in Table 1. The STA may include output queues of four types (AC_BK, AC_BE, AC_VI, and AC_VO) mapped to the user priorities of Table 1.

The STA may transmit the traffic data based on an arbitration interframe space (AIFS), instead of a DCF interframe space (DIFS) conventionally used.

Hereinafter, in an embodiment of the present invention, a wireless terminal (that is, an STA) may be a device capable of supporting both a WLAN system and a cellular system. That is, the wireless terminal may be construed as a UE supporting a cellular system or an STA supporting a WLAN system.

Interframe spacing mentioned in 802.11 is described for a concise description of the present specification. For example, an interframe interval (IFS) may be a reduced interframe space (RIFS), a short interframe space (SIFS), a PCF interframe space (PIFS), a DCF interframe space (DIFS), an arbitration interframe space (AIFS), or an extended interframe space (EIFS).

An IFS may be determined according to an attribute specified by a physical layer of an STA regardless of the bit rate of the STA. IFSs other than an AIFS may be construed as a fixed value for each physical layer.

An AIFS may be set to values corresponding to the four types of transmission queues mapped to the user priorities as shown in Table 2.

An SIFS has the shortest time gap among the above-mentioned IFSs. Accordingly, the SIFS may be used when an STA occupying a wireless medium needs to maintain the occupancy of the medium without interruption by another STA in a period during which a frame exchange sequence is performed.

That is, by using the smallest gap between transmissions in the frame exchange sequence, a priority may be given to the completion of the ongoing frame exchange sequence. In addition, the STA accessing the wireless medium using the SIFS may start transmission right at the boundary of the SIFS without determining whether the medium is busy.

The duration of an SIFS for a particular physical (PHY) layer may be defined by an aSIFSTime parameter. For example, an SIFS is 16 μs for a physical layer (PHY) in the IEEE 802.11a, IEEE 802.11g, IEEE 802.11n, and IEEE 802.11ac standards.

A PIFS may be used to provide an STA with the second highest priority after an SIFS. That is, the PIFS may be used to obtain a priority for accessing a wireless medium.

A DIFS may be used by an STA to send a data frame (MPDU) and a management frame (MAC protocol data unit (MPDU)) based on a DCF. After a received frame and a backoff time have expired, when a medium is determined to be idle via a carrier sense (CS) mechanism, the STA may transmit a frame.

Figure 14:
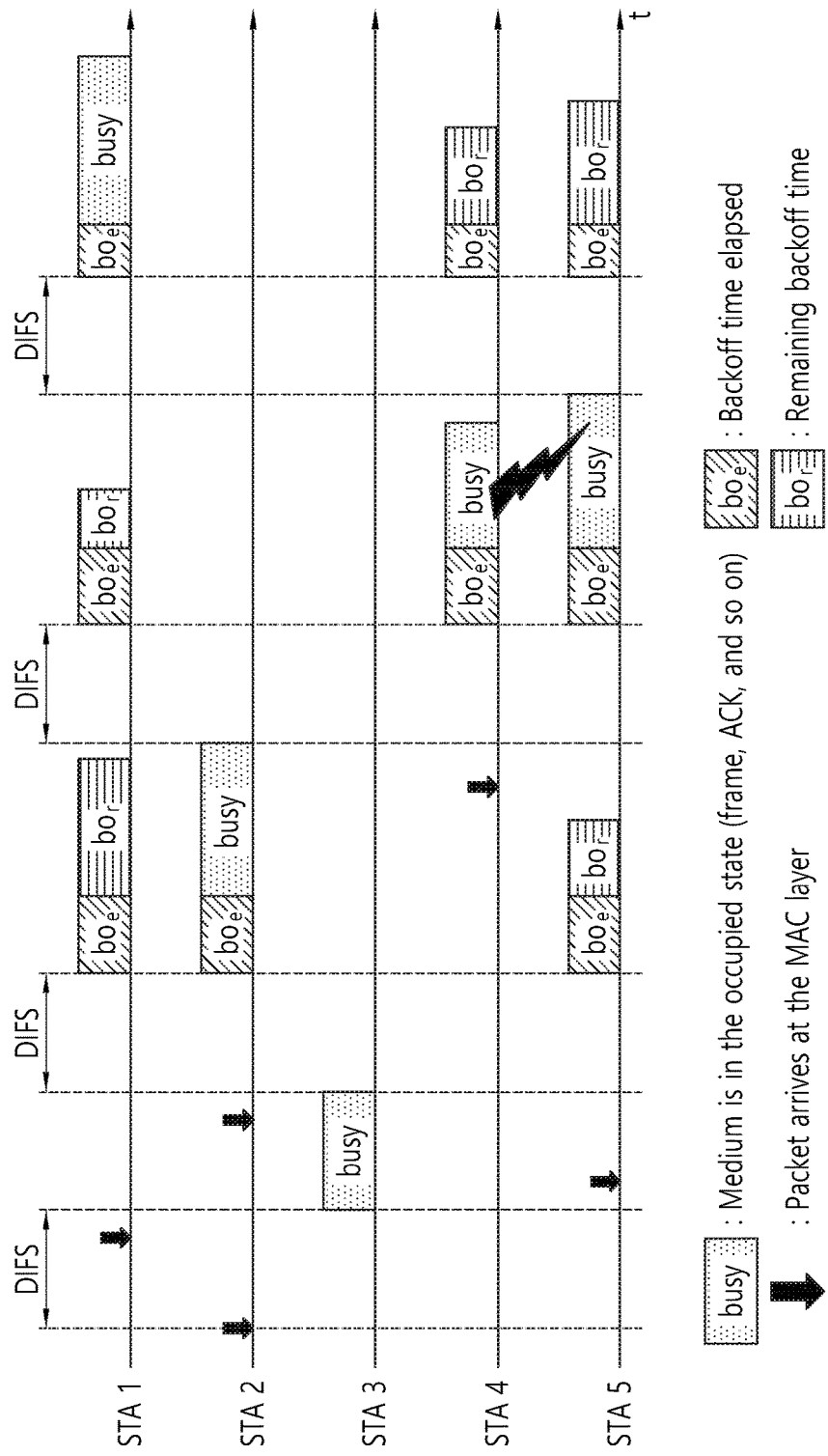
FIG. 14 illustrates a frame transmission procedure in a WLAN system.

FIG. 14 illustrates a frame transmission procedure in a WLAN system.

Referring to FIGS. 13 and 14, each STA 1410, 1420, 1430, 1440, and 1450 of the WLAN system may individually set a backoff value for performing a backoff procedure according to EDCA in a backoff counter of each STA 1410, 1420, 1430, 1440, and 1450.

Each STA 1410, 1420, 1430, 1440, and 1450 may attempt to transmission after waiting for a time of the selected backoff value expressed in slot time units (that is, the backoff window of FIG. 13).

In addition, each STA 1410, 1420, 1430, 1440, and 1450 may reduce the backoff window in slot time units through a countdown operation. The countdown operation for channel access to a wireless medium may be performed separately by each STA.

Each STA may individually set a random backoff time Tb[i] corresponding to the backoff window in the backoff counter of each STA. Specifically, the backoff time Tb[i] is a pseudo-random integer value and may be calculated based on Equation 1 below.

$$T_b[i] = \text{Random}(i) \times \text{SlotTime} \quad \text{[Equation 1]}$$

In Equation 1, Random(i) is a function that uses a uniform distribution and generates a random integer ranging from 0 to CW[i]. CW[i] may be construed as a contention window selected between the minimum contention window CWmin[i] and the maximum contention window CWmax[i].

For example, the minimum contention window CWmin[i] and the maximum contention window CWmax[i] may correspond to default values CWmin[AC] and CWmax[AC] in Table 2, respectively.

For initial channel access, the STA may select any integer between 0 and CWmin[i] using Random(i), with CW[i] set to CWmin[i]. In this case, any selected integer may be referred to as a backoff value.

In Equation 1, i may be construed as corresponding to the user priorities in Table 1. That is, it can be understood that traffic buffered in the STA corresponds to any one of AC_VO, AC_VI, AC_BE, and AC_BK in Table 1 based on a value set for i of Equation 1.

In Equation 1, SlotTime may be used to provide enough time for a preamble of a transmitting STA to be detected by a neighboring STA. SlotTime of Equation 1 may be used to define the above-mentioned PIFS and DIFS. For example, SlotTime may be 9 μs.

For example, when a user priority i is 7, an initial backoff time Tb[7] for an AC_VO-type transmission queue may be a time of a backoff value, which is selected between 0 and CWmin[AC_VO], expressed in slot time (SlotTime) units.

When a collision occurs between STAs according to a backoff procedure (or when no ACK frame of a transmitted frame is not received), the STA newly calculates an increased backoff time Tb[i]' based on Equation 2 below.

$$CW_{new}[i] = ((CW_{old}[i]+1) \times PF) - 1 \quad \text{[Equation 2]}$$

Referring to Equation 2, a new contention window $CW_{new}[i]$ may be calculated based on a previous window $CW_{old}[i]$. In Equation 2, PF may be calculated according to a procedure defined in IEEE 802.11e. For example, in Equation 2, PF may be set to 2.

In the present embodiment, the increased backoff time Tb[i]' may be construed as a time of a random integer (that is, a backoff value), which is selected between 0 and the new contention window $CW_{new}[i]$, expressed in slot time units.

The values of CWmin[i], CWmax[i], AIFS[i], and PF mentioned in FIG. 14 may be signaled from an AP through a QoS parameter set element as a management frame. The values of CWmin[i], CWmax[i], AIFS[i], and PF may be set in advance by the AP and the STA.

Referring to FIG. 14, the horizontal axis (t1 to t5) for first to fifth STAs 1410 to 1450 may denote time, and the vertical axis for the first to fifth STAs 1410 to 1450 may denote a backoff time in transmission.

Referring to FIGS. 13 and 14, when a particular medium is switched from an occupied or busy state to an idle state, a plurality of STAs may attempt data (or frame) transmission.

Here, to minimize collisions between STAs, each STA may select a backoff time Tb[i] according to Equation 1 and may attempt transmission after waiting for a slot time corresponding to the backoff time.

When the backoff procedure is initiated, each STA may count down the individually selected backoff counter time in slot time units. Each STA may continuously monitor the medium while counting down.

When the wireless medium is monitored to be in the occupied state, the STA may suspend and wait for the countdown. When the wireless medium is monitored to be in the idle state, the STA may resume the countdown.

Referring to FIG. 14, when a frame for the third STA 1430 reaches an MAC layer of the third STA 1430, the third STA 1430 may check whether the medium is idle during a DIFS. When the medium is determined to be idle during the DIFS, the third STA 1430 may transmit the frame to the AP (not shown). However, it should be understood that FIG. 14 shows a DIFS as an interframe space (IFS), but the present specification is not limited thereto.

While the frame is being transmitted from the third STA 1430, the remaining STAs may check whether the medium is occupied and may wait for the transmission period of the frame. A frame may reach an MAC layer of each of the first STA 1410, the second STA 1420 and the fifth STA 1450. When the media is identified as idle, each STA may wait for the DIFS and may count down an individual backoff time selected by each STA.

Referring to FIG. 14, the second STA 1420 selects the shortest backoff time, and the first STA 1410 selects the longest backoff time. At the time (T1) when the second STA 1420 completes the backoff procedure for the selected backoff time thereof and starts to transmit the frame, the remaining backoff time of the fifth STA 1450 is shorter than the remaining backoff time of the first STA 1410.

When the medium is occupied by the second STA 1420, the first STA 1410 and the fifth STA 1450 may suspend and wait for the backoff procedure. When the occupancy of the medium by the second STA 1420 is terminated (that is, the medium is idle again), the first STA 1410 and the fifth STA 1450 may wait for the DIFS.

Subsequently, the first STA 1410 and the fifth STA 1450 may resume the suspended backoff procedure based on the remaining backoff times. In this case, since the remaining backoff time of the fifth STA 1450 is shorter than the remaining backoff time of the first STA 1410, the fifth STA 1450 may complete the backoff procedure before the first STA 1410.

Referring to FIG. 14, when the medium is occupied by the second STA 1420, a frame for the fourth STA 1440 may reach an MAC layer of the fourth STA 1440. When the medium is idle, the fourth STA 1440 may wait for the DIFS. Subsequently, the fourth STA 1440 may count down the backoff time selected by the fourth STA 1440.

Referring to FIG. 14, the remaining backoff time of the fifth STA 1450 may coincide with the backoff time of the fourth STA 1440 by chance. In this case, a collision may occur between the fourth STA 1440 and the fifth STA 1450. When the collision occurs between the STAs, neither the fourth STA 1440 nor the fifth STA 1450 receives an ACK and may fail to transmit data.

Accordingly, the fourth STA 1440 and the fifth STA 1450 may individually calculate a new contention window $CW_{new}$ [i] according to Equation 2. Next, the fourth STA 1440 and the fifth STA 1450 may individually perform a countdown for the new backoff time calculated according to Equation 2.

Meanwhile, when the medium is occupied due to transmissions by the fourth STA 1440 and the fifth STA 1450, the first STA 1410 may wait. When the medium is idle, the first STA 1410 may wait for the DIFS and may resume backoff counting. After the elapse of the remaining backoff time of the first STA 1410, the first STA 1410 may transmit the frame.

The CSMA/CA mechanism may include not only physical carrier sensing, in which an AP and/or STA directly senses a media, but also virtual carrier sensing.

Virtual carrier sensing is intended to resolve a problem that may arise in media access, such as a hidden node problem. For virtual carrier sensing, MAC of a WLAN system uses a network allocation vector (NAV). The NAV is a value for an AP and/or STA currently using a medium or having a right to use the medium to notify another AP and/or STA of the remaining time until the medium becomes available.

Therefore, a set NAV value corresponds to a period during which a medium is scheduled to be used by an AP and/or STA that transmits a frame, and an STA receiving the NAV value is prohibited from accessing the medium during the period. An NAV may be set according to, for example, a value in a duration field of an MAC header of a frame.

Figure 15:
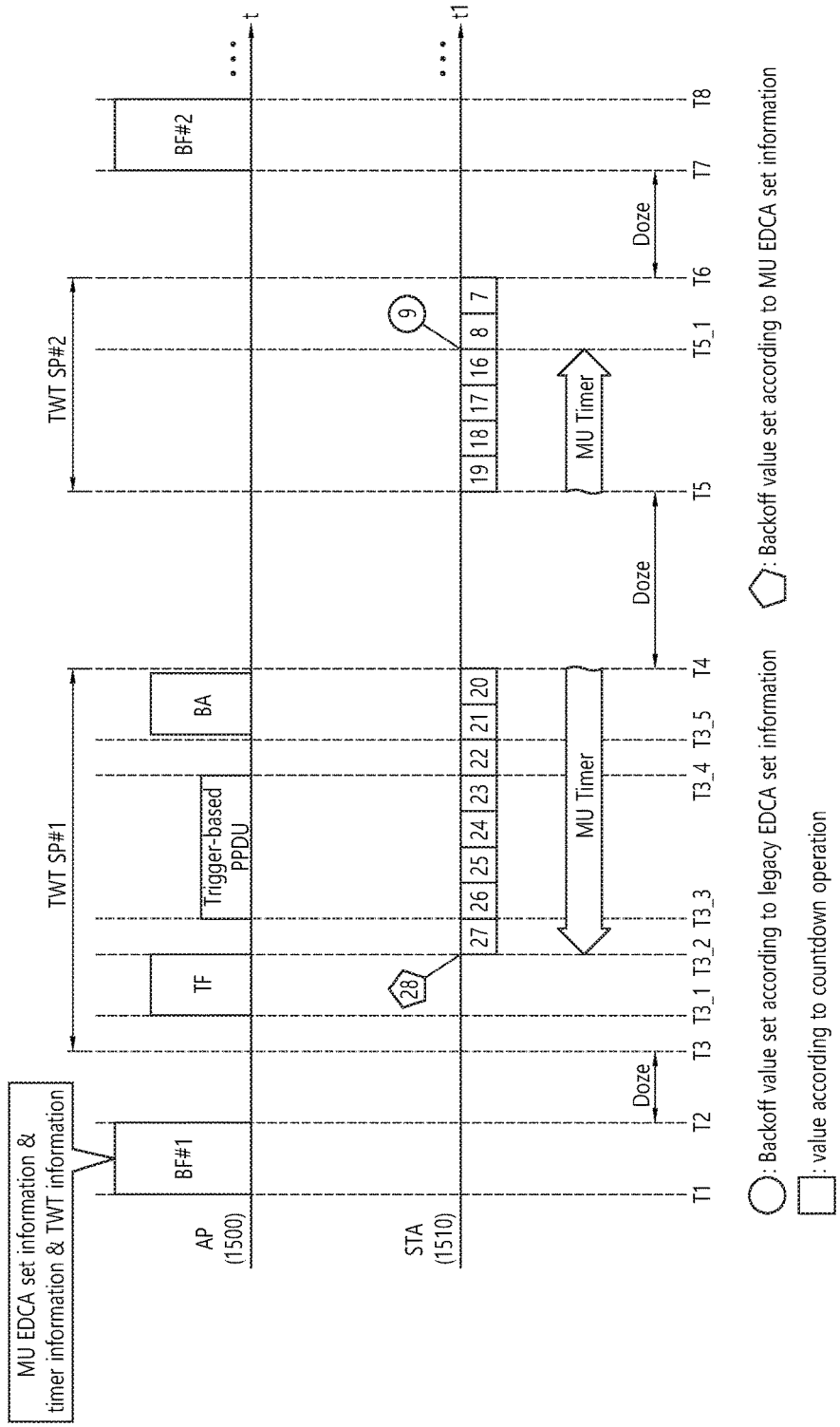
FIG. 15 illustrates a frame transmission method in a WLAN system according to an embodiment.

FIG. 15 illustrates a frame transmission method in a WLAN system according to an embodiment.

Referring to FIG. 15, the horizontal axis of an AP 1500 may denote time (t), and the vertical axis of the AP 1500 may be associated with the presence of a frame transmitted by the AP 1500. The horizontal axis of an STA 1510 may denote time (t1), and the vertical axis of the STA 1510 may be associated with the presence of a frame transmitted by the STA 1510.

The STA 1510 may be construed as a wireless terminal operating in a power save (hereinafter, "PS") mode. The STA 1510 in the PS mode may switch from an awake state to a doze state. The STA 1510 in the PS mode may switch from the doze state to the awake state.

For example, the awake state may be a state in which an STA can receive a frame from another STA and can transmit a frame to another STA. The sleep state may be a state in which an STA cannot receive a frame from another STA and cannot transmit a frame to another STA.

Referring to FIG. 15, a first target wake time (hereinafter "TWT") service period (TWT SP#1) and a second TWT service period (TWT SP#1) may be construed as a time interval according to a broadcast scheme for a plurality of STAs.

Alternatively, the first and second TWT service periods (TWT SP#1 and TWT SP#2) according to the present specification may be a time interval according to an individual scheme based on an individual negotiation operation between an STA and an AP.

Alternatively, one of the first and second TWT service periods (TWT SP#1 and TWT SP#2) may be a time interval according to the broadcast scheme, and the other thereof may be a time interval according to the individual scheme.

For a concise description of FIG. 15, it is assumed that the first and second TWT service periods (TWT SP#1 and TWT SP#2) are time intervals according to the broadcast scheme.

Referring to FIG. 15, in a first interval (T1 to T2), the AP 1500 may transmit a first beacon frame (hereinafter, "BF#1"). For example, the transmission periodicity of BF#1 (for example, T1 to T7 in FIG. 15) may be 100 ms.

BF#1 transmitted in the first interval (T1 to T2) may include first parameter set information (hereinafter "MU EDCA set information") for channel access of a plurality of user terminals participating in multi-user (hereinafter, "MU") uplink transmission.

Further, BF#1 may include MU timer information indicating an allowed time in which the use of the MU EDCA set information is allowed.

Specifically, the MU EDCA set information may include values corresponding to MU CWmin[AC], MU CWmax[AC], and MU AIFS[AC] for first to fourth ACs (AC_BK, AC_BE, AC_VI, and AC_VO) as in Table 3.

Further, the timer information may include values (tm1, tm2, tm3, and tm4) corresponding to MU Timer[AC] for the first to fourth ACs (AC_BK, AC_BE, AC_VI, and AC_VO) as in Table 3

TABLE 3

| AC | MU CWmin[AC] | MU CWmax[AC] | MU AIFS[AC] | MU Timer[AC] |
| --- | --- | --- | --- | --- |
| AC_BK | 62 | 2046 | 14 | tm1 |
| AC_BE | 62 | 2046 | 6 | tm2 |
| AC_VI | 30 | 62 | 4 | tm3 |
| AC_VO | 14 | 30 | 4 | tm4 |

Although not shown in FIG. 15, second parameter set information (hereinafter, "legacy EDCA set information") for channel access for single-user uplink transmission may be included in BF#1. Alternatively, the legacy EDCA set information may be information preset for each STA according to a provisioning scheme.

Specifically, the legacy EDCA set information may include values corresponding to CWmin[AC], CWmax[AC], and AIFS[AC] for first to fourth ACs (AC_BK, AC_BE, AC_VI, and AC_VO) as in Table 2.

Referring to Tables 2 and 3, the values of MU CWmin[AC], MU CWmax[AC], and MU AIFS[AC] in Table 3 may be set to be twice as large as the values of CWmin[AC], CWmax[AC], and AIFS[AC] in Table 2.

It is merely an example that the values in Table 3 are set to be twice as large as the values in Table 2, and the values in Table 3 may be set to be more times as large as the values in Table 2. Further, a different multiplier may be set for each AC according to an embodiment.

By setting a great value for the EDCA parameter set information as shown in Table 3, it is possible to lower the transmission priority of channel access performed by an STA which is highly likely to receive a trigger frame for uplink transmission from the AP. Accordingly, performance in terms of overall fairness of the WLAN system may be improved.

BF#1 transmitted in the first interval (T1 to T2) may also include TWT information including first TWT information and second TWT information.

According to the foregoing assumption that the first and second TWT service periods (TWT SP#1 and TWT SP#2) are time intervals according to the broadcast scheme, the first TWT information may include start time information (for example, T3) on the first TWT service period (TWT SP#1) and duration information (for example, T3 to T4) on the first TWT service period (TWT SP#1).

Further, the first TWT information may include transmission time information (for example, T3_1) on a trigger frame (TF) including a plurality of resource units for uplink transmission in the first TWT service period (TWT SP#1).

For example, the second TWT information may include start time information (for example, T5) on the second TWT service period (TWT SP#2) and duration information (for example, T5 to T7) on the second TWT service period (TWT SP#2).

That is, the STA 1510 may acquire the start time information (for example, T3) on the first TWT service period (TWT SP#1) and the duration information (for example, T3 to T4) on the first TWT service period (TWT SP#1) through received BF#1.

Further, the STA 1510 may acquire transmission time information (for example, T3_1) on the trigger frame (TF) in the first TWT service period (TWT SP#1) through received BF#1.

The STA 1510 may acquire the start time information (for example, T5) on the second TWT service period (TWT SP#2) and the duration information (for example, T5 to T7) on the second TWT service period (TWT SP#2) through received BF#1.

At a second time (T2), the STA 1510 may switch to the doze state. For example, the STA 1510 may switch to the doze state according to the start time information on the first TWT service period (TWT SP#1).

In a second interval (T2 to T3), the STA 1510 may maintain the doze state.

At a third time (T3), the STA 1510 may switch to the awake state. For example, the STA 1510 may switch from the doze state to the awake state according to the start time information on the first TWT service period (TWT SP#1).

In a third interval (T3 to T4), the STA 1510 may maintain the awake state. For example, the STA 1510 may maintain the doze state according to the duration information on the first TWT service period (TWT SP#1).

In the third interval (T3 to T4), the STA 1510 may receive the trigger frame (hereinafter, "TF"). For example, the STA 1510 may receive the TF at a specified time (T3_1) according to reception time information on the TF.

For example, the TF may be a frame for individually allocating a plurality of uplink radio resources for a plurality of user terminals participating in MU uplink transmission.

An uplink radio resource mentioned the present specification may be construed as a resource unit (RU) mentioned above with reference to FIGS. 4 to 6.

The TF may be understood from the above description of FIGS. 9 to 11. The TF may be construed as a frame in which the trigger type (1060 in FIG. 10) is set as a basic type.

When the TF is completely received at a timer start time (T3_2), the STA 1510 may start an MU timer based on the MU timer information. Specifically, the MU timer may correspond to a time interval in which the STA is allowed to use the MU EDCA set information corresponding to Table 3 for channel access.

For example, the MU EDCA set information may include the values corresponding to MU CWmin[AC], MU CWmax[AC], and MU AIFS[AC] for the first to fourth ACs (AC_BK, AC_BE, AC_VI, and AC_VO) as in Table 3.

A timer operation by the STA 1510 may be performed for a time corresponding to the MU timer. That is, the time corresponding to the MU timer may be a time interval according to a value corresponding to MU Timer[AC].

For example, any one of the values (tm1, tm2, tm3, and tm4) corresponding to MU Timer[AC] for the first to fourth ACs (AC_BK, AC_BE, AC_VI, and AC_VO) in Table 3 may be set in MU Timer[AC] according to the AC type of data to be transmitted by the STA.

For a concise and clear description of FIG. 15, it may be assumed that a data frame to be transmitted by the STA 1510 is the AC_VI type. Accordingly, a specified value (that is, tm3) may be set in MU Timer[AC] for the MU timer.

The timer operation starting at the timer start time (T3_2) may continue to the end time (T4) of the first TWT service period (TWT SP#1). That is, the MU timer may be suspended after the TWT service period (TWT SP).

When the TF is completely received at the timer start time (T3_2), the STA 1510 may set a backoff counter of the STA 1510 based on the MU EDCA set information corresponding to Table 3.

For example, when data to be transmitted by the STA 1510 is the AC_VI type, MU CWmin[AC_VI] may correspond to 30 and MU CWmax[AC_VI] may correspond to 62 according to Table 3. Accordingly, 30 corresponding to MU CWmin[AC_VI] may be set in a contention window (CW [i]) for the STA 1510.

A random function (Random(i)) for the STA 1510 may select an integer from 0 to 30 at random. For example, the random function (Random(i)) for the STA 1510 may set a random value to 28. Accordingly, a random backoff time (RBT) set in the backoff counter of the STA 1510 may be 28 slots.

A first standby interval (T3_2 to T3_3) may be construed as a short interframe space (SIFS).

In a transmission interval (T3_3 to T3_4), the STA 1510 may transmit a trigger-based uplink frame (trigger-based PPDU) through an uplink radio resource allocated for the STA 1510 among a plurality of uplink radio resources. For example, the trigger-based uplink frame may include the AC_VI type of data.

A second standby interval (T3_4 to T3_5) may be construed as an SIFS.

In an acknowledgment interval (T3_5 to T4), the AP 1500 may transmit a block acknowledgement (hereinafter, "BA") frame to indicate the successful reception of the trigger-based uplink frame.

Although not shown in FIG. 15, the BA frame may be a frame for indicating the successful reception of another trigger-based uplink frame transmitted in an overlapping time interval (T3_3 to T3_4) in response to a TF from an STA other than the STA 1510.

The STA 1510 according to the present embodiment may reduce the backoff counter by seven slots through a countdown operation from the time (T3_2) when the TF is received to the end time (T4) of the first TWT service period (TWT SP#1).

At a fourth time (T4), the STA 1510 may switch to the doze state. For example, the STA 1510 may switch to the doze state according to the duration information on the first TWT service period (TWT SP#1).

In a fourth interval (T4 to T5), the STA 1510 may maintain the doze state. Further, since the fourth interval (T4 to T5) is not a TWT service period (TWT SP), the MU timer according to the present embodiment may be suspended in the fourth interval (T4 to T5).

Further, the STA 1510 may suspend the countdown operation in the fourth interval (T4 to T5) which is not a TWT service period (TWT SP).

At a fifth time (T5), the STA 1510 may switch to the awake state. For example, the STA 1510 may switch to the awake state according to the start time information on the second TWT service period (TWT SP#2).

In a fifth interval (T5 to T6), the STA 1510 may maintain the awake state. Since the fifth interval (T5 to T6) is a TWT service period (TWT SP), the MU timer according to the present embodiment may be resumed from the fifth time (T5).

Further, the STA 1510 may resume the countdown operation in the fifth interval (T5 to T6) which is a TWT service period (TWT SP).

For example, the timer operation according to the resumed MU timer may be performed for a remaining time (T5 to T5_1) excluding an elapsed time (T3_2~T4) in the first TWT service period out of allowed time indicated by the specified value (that is, tm3) set in MU Timer[AC].

At a time (T5_1) when the timer expires, the STA 1510 may determine that a time interval in which the use of the MU EDCA set information is allowed has expired. Thus, the STA 1510 may reset the backoff counter of the STA 1510 based on the legacy EDCA set information corresponding to Table 2.

For example, when data to be transmitted by the STA 1510 is the AC_VI type, CWmin[AC_VI] may correspond to 15 and CWmax[AC_VI] may correspond to 31 according to Table 2. Accordingly, 15 corresponding to CWmin [AC_VI] may be set in the contention window CW[i] for STA 1510.

The random function (Random(i)) for the STA 1510 may select an integer from 0 to 15 at random. For example, the random function (Random(i)) for the STA 1510 may set a random value to 9. Accordingly, the random backoff time (RBT) set in the backoff counter of the STA 1510 may be 9 slots.

The STA 1510 according to the present embodiment may reduce the backoff counter by one slot through the countdown operation from the time (T5_1) when the timer expires to the end time (T6) of the second TWT service period (TWT SP#2).

At a sixth time (T6), the STA 1510 may switch to the doze state. For example, the STA 1510 may switch to the doze state according to the duration information on the second TWT service period (TWT SP#2).

In a sixth interval (T6 to T7), the STA 1510 may maintain the doze state.

Further, the STA 1510 may suspend the countdown operation in the sixth interval (T6 to T7) which is not a TWT service period (TWT SP).

Although FIG. 15 illustrates a channel access procedure between one AP and one STA, it should be noted that the same procedure may be applied to channel access between one AP and a plurality of STAs.

According to the present embodiment, out of a TWT service period, not only the countdown operation for channel access but also the MU timer operation to indicate a valid period of the MU EDCA set information may be suspended.

In this case, overhead that occurs when the STA repeatedly replaces the legacy EDCA set information and the MU EDCA set information in order to set the backoff value in the backoff counter may be reduced. Accordingly, according to the present embodiment, a WLAN system having improved performance may be provided FIG. 16 is a flowchart illustrating a frame transmission method in a WLAN system according to an embodiment.

Referring to FIGS. 1 to 16, in step S1610, a first wireless terminal (that is, a user STA) according to the present embodiment may receive, from a second wireless terminal (that is, an AP), a beacon frame including first parameter set information, timer information indicating an allowed time allowed for the first parameter set information, first TWT information for a first TWT service period, and second TWT information for a second TWT service period.

Figure 16:
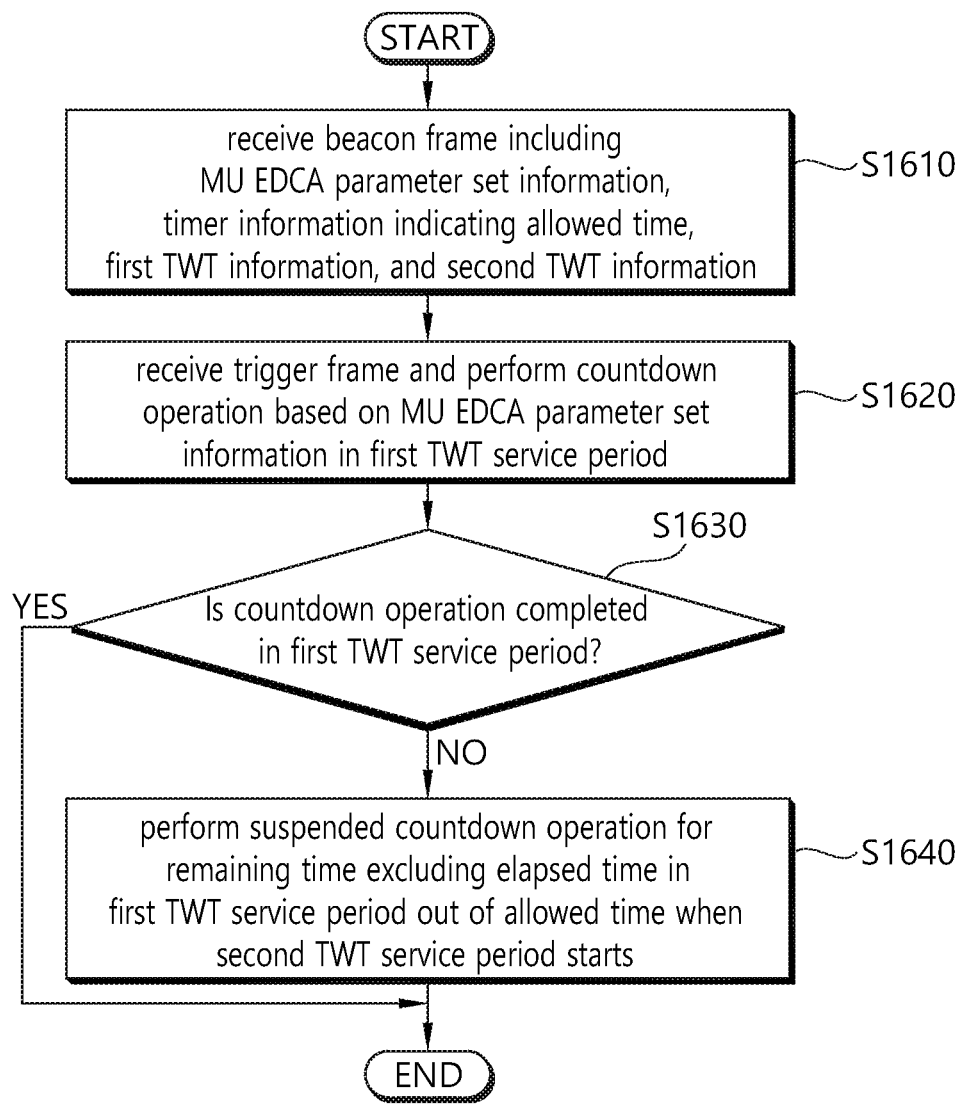
FIG. 16 is a flowchart illustrating a frame transmission method in a WLAN system according to an embodiment.

The first parameter set information of FIG. 16 may be construed as the MU EDCA set information described in FIG. 15. The timer information of FIG. 16 may be construed as the MU timer information described in FIG. 15.

Specifically, the first parameter set information may include information for channel access of a plurality of user terminals participating in MU uplink transmission. For example, the first wireless terminal is one of the plurality of user terminals.

In step S1620, the first wireless terminal (that is, the user STA) may receive a trigger frame for individually allocating a plurality of uplink radio resources for the plurality of user terminals from the second wireless terminal (that is, the AP) in the first TWT service period.

In this case, the first wireless terminal may set a backoff counter for channel access according to the first parameter set information received via the beacon frame. Subsequently, the first wireless terminal may perform a countdown operation based on the backoff counter which is set according the first parameter set information.

In step S1630, the first wireless terminal may determine whether the countdown operation is completed until the first TWT service period expires. When the countdown operation by the first wireless terminal is completed before the first TWT service period expires, the procedure may be terminated.

When the countdown operation by the STA is not completed until the first TWT service period expires, the first wireless terminal may suspend the countdown operation at a time when the first TWT service period expires. Next, step 1640 may be performed.

In step S1640, the first wireless terminal may resume the countdown operation when the second TWT service period starts. In this case, the resumed countdown operation may be performed for a remaining time excluding an elapsed time in the first TWT service period out of the allowed time allowed for the first parameter set information.

Although not shown in the flowchart of FIG. 16, when the remaining time elapses before the second TWT service period expires, the first wireless terminal may reset the backoff counter according to preset second parameter set information for channel access for single-user uplink transmission.

In this case, the second parameter set information of FIG. 16 may be construed as the legacy EDCA set information described in FIG. 15.

Figure 17:
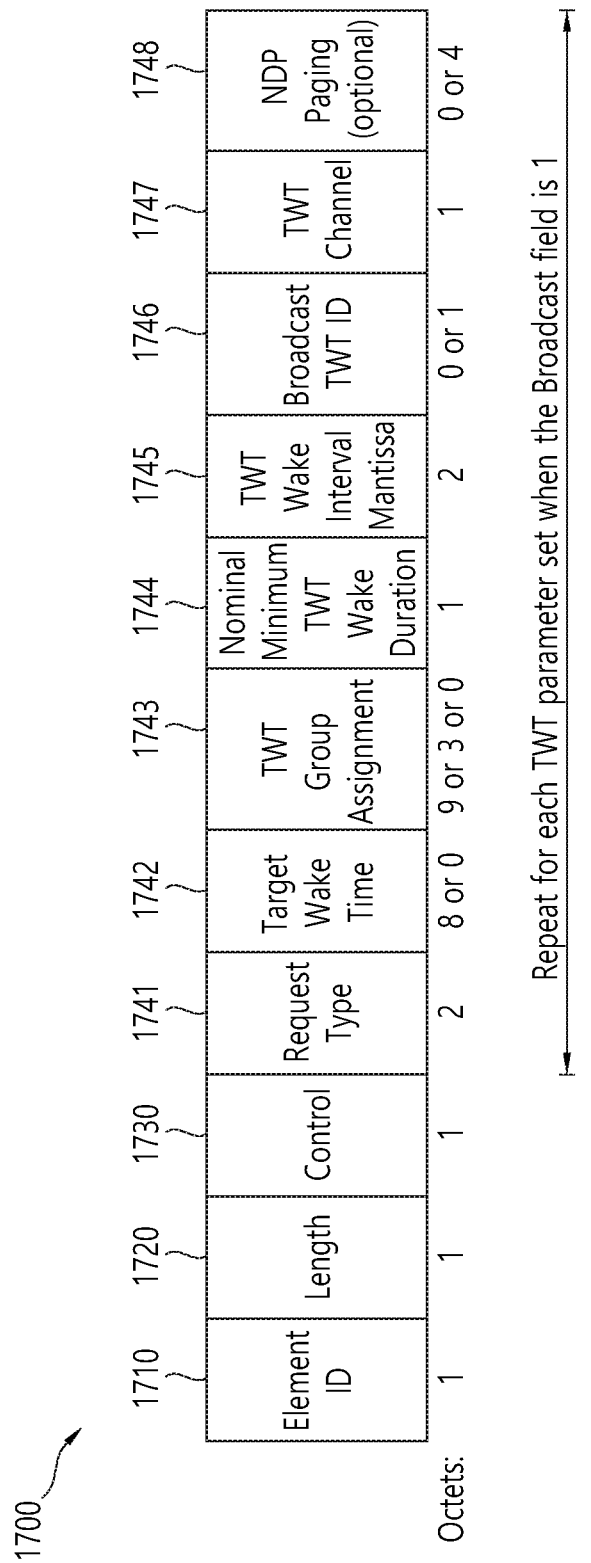
FIG. 17 illustrates an example of TWT information according to an embodiment.

FIG. 17 illustrates an example of TWT information according to an embodiment.

Referring to FIGS. 1 to 17, the TWT information described in FIGS. 15 and 16 may be construed as a TWT element 1700 of FIG. 17. The TWT element 1700 may include a plurality of fields 1710 to 1730 and 1741 to 1748.

One octet may be assigned for an Element ID field 1410. The Element ID field 1710 may be set to a value to indicate the TWT element 1700 among at least one of elements included in a beacon frame.

One octet may be assigned for a Length field 1720. The Length field 1720 may be set to a value to indicate the total number of bits assigned for the TWT element 1700.

One octet may be assigned for a Control field 1730. The Control field 1730 may include an indicator that indicates whether a TWT service period (TWT SP) according to the TWT element 1700 is a broadcast TWT period for a plurality of STAs.

Hereinafter, it is assumed that the Control field 1730 includes an indicator that indicates a broadcast TWT period. The broadcast TWT period may refer to a time interval according to a broadcast scheme for all user STAs receiving a beacon frame.

When the broadcast TWT period is indicated (for example, when the indicator is set to 1), one or more TWT parameter sets 1741 to 1748 may be repeatedly included in the TWT element 1700 as many times as the number of TWT service periods.

For example, when a beacon interval includes a plurality of broadcast TWT periods (for example, a first broadcast TWT period and a second broadcast TWT period), the TWT parameter set 1741 to 1748 may be included twice in the TWT element 1700.

For instance, a first TWT parameter set having the format of the TWT parameter set 1741 to 1748 may be assigned for the first broadcast TWT period. A second TWT parameter set having the format of the TWT parameter set 1741 to 1748 may be assigned for the second broadcast TWT period.

Two octets may be assigned for a Request field 1741. The Request field 1741 may include information indicating the type of a frame allowed to be transmitted/received in a TWT service period.

When the broadcast TWT period is indicated, eight octets may be assigned for a Target Wake Time field 1742.

The Target Wake Time field 1742 may include information on the start time of the broadcast TWT service period. Specifically, the Target Awake Time field 1742 may include information associated with a timing synchronization function (TSF) timer for waking up an STA receiving the TWT element 1700 in the TWT service period.

A TWT Group Assignment field 1743 may indicate group information on an STA to receive the TWT element 1700. For example, when the broadcast TWT period is indicated in the TWT element 1700, no TWT Group Assignment field 1743 may be assigned.

One octet may be assigned for a Nominal Minimum TWT Wake Duration field 1744. The Nominal Minimum TWT Wake Duration field 1744 may include information associated with the duration of the TWT service period (TWT SP).

Two octets may be assigned for a TWT Wake Interval Mantissa field 1745. The TWT Wake Interval Mantissa field 1745 may include information on a TWT wake interval associated with the reception time of a subsequent BF.

A Broadcast TWT ID field 1746 may include information for indicating a TWT service period (TWT SP) in which an STA requesting the TWT element 1700 is to participate. The Broadcast TWT ID field 1746 may include information for indicating a specified TWT service period (TWT SP) provided by an STA transmitting the TWT element 1700.

A TWT Channel field 1747 may include bitmap information for indicating which channel an STA uses as a temporary primary channel during the TWT service period (TWT SP). An NDP Paging field 1748 may optionally be included in the TWT element 1700.

Details of the TWT element may be understood with reference to section 9.4.2.200 of the IEEE P802.11ax/D1.0 standard document, disclosed in November 2016.

Figure 18:
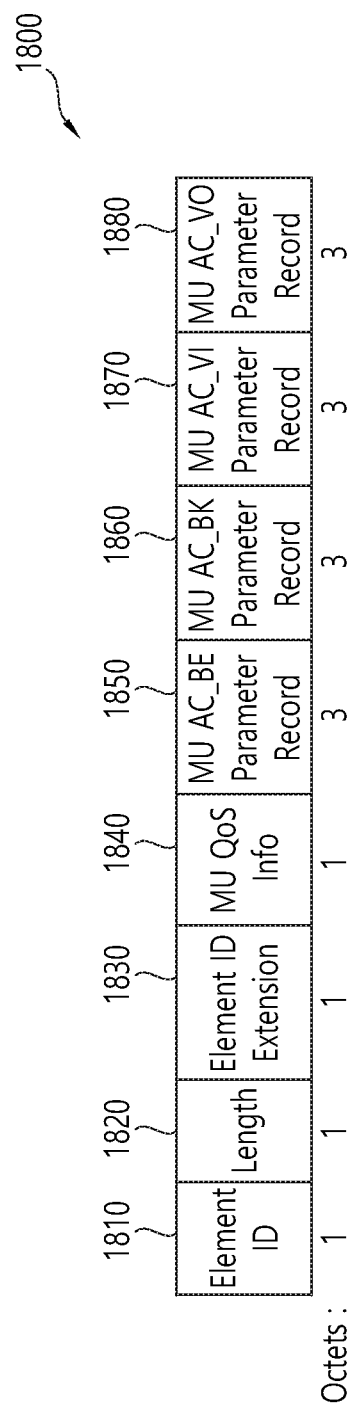
FIGS. 18 and 19 illustrate a format of an element for MU EDCA set information according to an embodiment.
Figure 19:
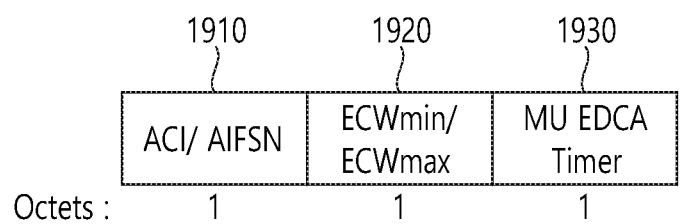

FIGS. 18 and 19 illustrate a format of an element for MU EDCA set information according to an embodiment.

Referring to FIGS. 18 and 19, the element including MU EDCA set information and MU timer information according to the present embodiment may be referred to as an MU EDCA element 1800. The MU EDCA element 1800 may be included in a beacon frame periodically transmitted by an AP. The MU EDCA element 1800 may include a plurality of fields 1810 to 1880.

An Element ID field 1810 may be set to a value to indicate the MU EDCA element 1800 among at least one of elements included in the beacon frame. For example, one octet may be assigned for the Element ID field 1810.

A Length field 1820 may be set to a value to indicate the total number of bits assigned for the MU EDCA element 1800. For example, one octet may be assigned for the Length field 1820.

An Element ID Extension field 1830 may include additional information for the Element ID field 1810. For example, one octet may be assigned for the Element ID Extension field 1830.

An MU QoS Information field 1840 may include information for determining whether to change the MU EDCA set information. For example, one octet may be assigned for the MU QoS Information field 1840.

An MU AC_BE Parameter Record field 1850, an MU AC_BK Parameter Record field 1860, an MU AC_VI Parameter Record field 1870, and an MU AC_VO Parameter Record field 1880 may include MU EDCA parameter values corresponding to each AC.

The MU AC_BE Parameter Record field 1850, the MU AC_BK Parameter Record field 1860, the MU AC_VI Parameter Record field 1870, and the MU AC_VO Parameter Record field 1880 each have a structure of subfields illustrated in FIG. 19.

Referring to FIGS. 1 to 19, a plurality of subfields 1910, 1920, and 1930 in FIG. 19 may be included in the MU AC_BE Parameter Record field 1850. The plurality of subfields 1910, 1920, and 1930 in FIG. 19 may be included in the MU AC_BK Parameter Record field 1860.

The plurality of subfields 1910, 1920, and 1930 in FIG. 19 may be included in the MU AC_VI Parameter Record field 1870. The plurality of subfields 1910, 1920, 1930 in FIG. 19 may be included in the MU AC_VO Parameter Record field 1880.

The MU EDCA set information mentioned above in FIG. 15 may be construed as information included in an ACI/AIFSN subfield 1910 and an ECWmin/ECWmax subfield 1920 included in each of the plurality of fields 1850, 1860, 1870 and 1880.

Similarly, the MU timer information mentioned above in FIG. 15 may be construed as information included in an MU EDCA Timer subfield 1930 included in each of the plurality of fields 1850, 1860, 1870, and 1880.

For conciseness, a description is made with reference to the plurality of subfields 1910, 1920, and 1930 included in the MU AC_VI Parameter Record field 1870 hereinafter.

The ACI/AIFSN subfield 1910 may include a value corresponding to MU AIFS[AC_VI] in Table 3. The ECWmin/ECWmax subfield 1920 may include values corresponding to MU CWmi[AC_VI] and MU CWmax[AC_VI] in Table 3. The MU EDCA Timer subfield 1930 may include a value corresponding to MU Timer[AC_VI] in Table 3.

For reference, details of the MU EDCA element may be specified in section 9.4.2.221 of the IEEE Draft P802.11ax™/D1.0 standard document, disclosed in November 2016.

Figure 20:
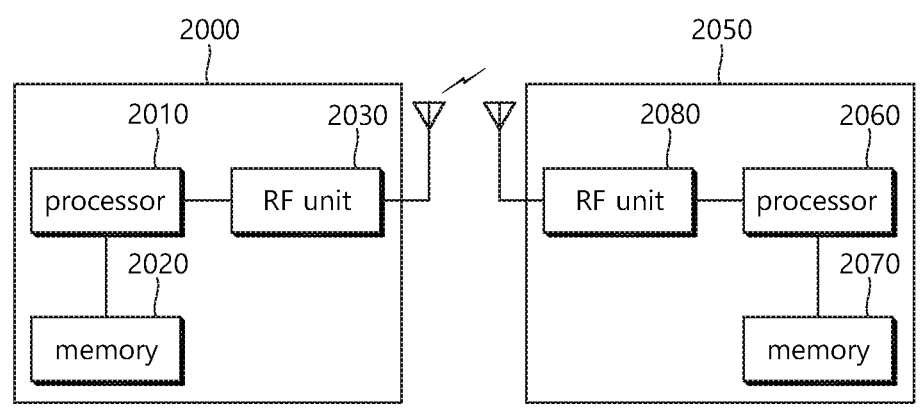
FIG. 20 is a block view illustrating a wireless terminal to which the exemplary embodiment of the present invention can be applied.

FIG. 20 is a block view illustrating a wireless terminal to which the exemplary embodiment of the present invention can be applied.

Referring to FIG. 20, as an STA that can implement the above-described exemplary embodiment, the wireless terminal may correspond to an AP or a non-AP station (STA). The wireless terminal may correspond to the above-described user or may correspond to a transmitting device transmitting a signal to the user.

The AP 2000 includes a processor 2010, a memory 2020, and a radio frequency (RF) unit 2030.

The RF unit 2030 is connected to the processor 2010, thereby being capable of transmitting and/or receiving radio signals.

The processor 2010 implements the functions, processes, and/or methods proposed in the present invention. For example, the processor 2010 may be implemented to perform the operations according to the above-described exemplary embodiments of the present invention. More specifically, among the operations that are disclosed in the exemplary embodiments of FIG. 1 to FIG. 19, the processor 2010 may perform the operations that may be performed by the AP.

The non-AP STA 2050 includes a processor 2060, a memory 2070, and a radio frequency (RF) unit 2080.

The RF unit 2080 is connected to the processor 2060, thereby being capable of transmitting and/or receiving radio signals.

The processor 2060 implements the functions, processes, and/or methods proposed in the present invention. For example, the processor 2060 may be implemented to perform the operations of the non-AP STA according to the above-described exemplary embodiments of the present invention. The processor may perform the operations of the non-AP STA, which are disclosed in the exemplary embodiments of FIG. 1 to FIG. 19.

The processor 2010 and 2060 may include an application-specific integrated circuit (ASIC), another chip set, a logical circuit, a data processing device, and/or a converter converting a baseband signal and a radio signal to and from one another. The memory 2020 and 2070 may include a read-only memory (ROM), a random access memory (RAM), a flash memory, a memory card, a storage medium, and/or another storage device. The RF unit 2030 and 2080 may include one or more antennas transmitting and/or receiving radio signals. When the exemplary embodiment is implemented as software, the above-described method may be implemented as a module (process, function, and so on) performing the above-described functions. The module may be stored in the memory 2020 and 2070 and may be executed by the processor 2010 and 2060. The memory 2020 and 2070 may be located inside or outside of the processor 2010 and 2060 and may be connected to the processor 2010 and 2060 through a diversity of well-known means.

Although an embodiment of the invention has been described in detail in the present specification, various modifications are possible without departing from the scope of the present specification. Therefore, the scope of the present specification should not be construed as being limited to the aforementioned embodiment, but should be defined by not only claims of the invention described below but also equivalents to the claims.

What is claimed is:

1. A method for transmitting a frame in a wireless local area network (WLAN) system, the method comprising:
receiving, by a first wireless terminal, from a second wireless terminal, a beacon frame including first parameter set information for first channel access of a plurality of user terminals participating in multi-user uplink transmission, timer information indicating an allowed time allowed for the first parameter set information, first target wake time (TWT) information for a first TWT service period, and second TWT information for a second TWT service period;
performing, by the first wireless terminal, a countdown operation based on a backoff counter which is set according to the first parameter set information when a trigger frame for individually allocating a plurality of radio resources for the plurality of user terminals is received in the first TWT service period;

suspending, by the first wireless terminal, the countdown operation when the countdown operation is not completed until the first TWT service period expires; and resuming, by the first wireless terminal, the countdown operation when the second TWT service period starts, wherein the resumed countdown operation is performed for a remaining time excluding an elapsed time in the first TWT service period out of the allowed time.

2. The method of claim 1, further comprising resetting, by the first wireless terminal, the backoff counter according to second parameter set information which is preset for second channel access for single-user uplink transmission when the remaining time elapses before the second TWT service period expires.

3. The method of claim 2, wherein the first parameter set information includes a first minimum contention window value for the backoff counter,
wherein the second parameter set information includes a second minimum contention window value for the backoff counter, and
wherein the first minimum contention window value is set to be greater than the second minimum contention window value.

4. The method of claim 3, wherein a first backoff value, which is an integer randomly selected by the first wireless terminal in a range from 0 to the first minimum contention window value, is set in the backoff counter in the first channel access, and
wherein a second backoff value, which is an integer randomly selected by the first wireless terminal in a range from 0 to the second minimum contention window value, is set in the backoff counter in the second channel access.

5. The method of claim 1, wherein the first wireless terminal is either in a doze state or in an awake state in a power-save mode,
wherein the doze state is a state in which the first wireless terminal is unable to transmit an uplink frame to the second wireless terminal or is unable to receive a downlink frame from the second wireless terminal, and
wherein the awake state is a state in which the first wireless terminal is able to transmit the uplink frame to the second wireless terminal or is able to receive the downlink frame from the second wireless terminal.

6. The method of claim 5, further comprising:
maintaining, by the first wireless terminal, the doze state until the first TWT service period starts according to the first TWT information after receiving the beacon frame; and
maintaining, by the first wireless terminal, the doze state until the second TWT service period starts according to the second TWT information after the first TWT service period expires.

7. The method of claim 1, wherein the allowed time is calculated based on a time when the trigger frame is received.

8. The method of claim 1, wherein the trigger frame is set to a basic type, wherein the first wireless terminal is addressed by the trigger frame, and wherein the first wireless terminal is one of the plurality of user terminals.

9. The method of claim 1, wherein the first TWT service period and the second TWT service period is a service period according to a broadcast scheme.

10. A first wireless terminal using a method for transmitting a frame in a wireless local area network (WLAN) system in the WLAN system, the first wireless terminal comprising:
a transceiver to transmit and receive a radio signal; and
a processor connected to the transceiver,
wherein the processor is configured to:
receive, from a second wireless terminal, a beacon frame including first parameter set information for first channel access of a plurality of user terminals participating in multi-user uplink transmission, timer information indicating an allowed time allowed for the first parameter set information, first target wake time (TWT) information for a first TWT service period, and second TWT information for a second TWT service period;
perform a countdown operation based on a backoff counter which is set according to the first parameter set information when a trigger frame for individually allocating a plurality of radio resources for the plurality of user terminals is received in the first TWT service period;
suspend the countdown operation when the countdown operation is not completed until the first TWT service period expires; and
resume the countdown operation when the second TWT service period starts, wherein the resumed countdown operation is performed for a remaining time excluding an elapsed time in the first TWT service period out of the allowed time.

\* \* \* \* \*